United States Patent [19]

Shi

[11] Patent Number: 5,517,656

[45] Date of Patent: May 14, 1996

[54] MULTICOMPUTER SYSTEM AND METHOD

[75] Inventor: Yuan Shi, Wayne, Pa.

[73] Assignee: Temple University of the Commonwealth System of Higher Education, Philadelphia, Pa.

[21] Appl. No.: 75,392

[22] Filed: Jun. 11, 1993

[51] Int. Cl.$^6$ ..................................... G06F 15/82
[52] U.S. Cl. ................. 395/800; 364/229.3; 364/232.22; 364/240.4; 364/DIG. 1
[58] Field of Search ...................................... 395/700, 800

[56] References Cited

U.S. PATENT DOCUMENTS

| | | | |
|---|---|---|---|
| 4,106,176 | 8/1978 | Rice et al. | 29/407 |
| 4,217,590 | 8/1980 | Wild et al. | 343/754 |
| 4,343,215 | 8/1982 | Fuchs | 83/670 |
| 4,446,515 | 5/1984 | Sauer | 395/200.01 |
| 4,607,255 | 8/1986 | Fuchs et al. | 340/755 |
| 4,827,445 | 5/1989 | Fuchs | 364/900 |
| 5,151,900 | 9/1992 | Snyder | 370/94.3 |
| 5,276,893 | 1/1994 | Savaria | 395/800 |
| 5,297,269 | 3/1994 | Donaldson | 395/425 |
| 5,313,647 | 5/1994 | Kaufman | 395/700 |

OTHER PUBLICATIONS

Gelernter David, *Getting the Job Done*, BYTE, Nov. 1988, pp. 301–302, 306.
Andre S. Tanenbaum, M. Frans Kaashoek, Henri E, Bal, *Parallel Programming Using Shared Objects and Broadcasting*, IEEE Computer, Aug. 1992, pp. 10–19.

Henry Fuchs, John Poulton, *Pixel–Planes 5*, University of North Carolina, Jul. 1992, pp. 1–2.

Azuma Ronald, Mark Ward, *Head–Tracker Research*, University of North Carolina, Aug. 1992, pp. 1–2.

Fred Brooks, Henry Fuchs, *Head–Mounted Display Research*, University of North Carolina, Aug. 1992, pp. 1–2.

*Primary Examiner*—Eric Coleman
*Attorney, Agent, or Firm*—David Newman & Associates

[57] ABSTRACT

A multicomputer system and method for automatic sequential-to-parallel program partition, scheduling and execution. The plurality of computer are connected via a uni-directional slotted ring (backbone). The ring supports, with deterministic delays, point-to-point, broadcast and EXCLUSIVE-READ operations over labeled tuples. The execution of parallel programs uses a connectionless computing method that forms customized coarse grain SIMD, MIMD and pipelined processors automatically using the connected multicomputers. The disclosed multicomputer architecture is also resilient to processor and backbone failures.

53 Claims, 17 Drawing Sheets

S1 PURE SEQUENTIAL SEGMENT

L1 VECTORIZABLE ITERATION

S2

R1 PARALLELIZABLE RECURSIVE PROCEDURE

S3

DATA DEPENDENCIES

MULTICOMPUTER SYSTEM AND METHOD

BACKGROUND OF THE INVENTION

This invention relates to a system for connecting a plurality of computers to a network for parallel processing.

DESCRIPTION OF THE RELEVANT ART

As computers have become less expensive, the interest in linking multiple computers to effect powerfully distributed and parallel multicomputer systems has increased. Systems with multiple processors may be divided into two categories: systems with physically shared memory, called multi-processors, and systems without physically shared memory, called multi-computers.

For single computers, the execution mode for sequential machines is single instruction, single data (SISD) computing. As illustrated in FIG. 1, a SISD computer operates a single instruction, I, on a single datum, D, one at a time, in an arrangement commonly known as the yon Neumann architecture.

For parallel processing, Flynn's Taxonomy classifies three methods of computing. The first method includes single instruction, multiple data (SIMD) computing, known as vector processing. As shown in FIG. 2, with SIMD computing, processors are loaded with the same set of instructions, but each processor operates on a different set of data. SIMD computing has each processor calculating, for a set of data, $D_1$, $D_2$, $D_3$, $D_4$, using the same instruction set I, in parallel.

The second method of parallel computing is multiple instruction, multiple data (MIMD) computing. MIMD computing has different data processed by different instruction sets, as indicated in FIG. 3. MIMD computing breaks the execution by a parallel software into pieces, thereby providing multiple instruction sets or multiple processors, $I_1$, $I_2$, $I_3$, $I_4$. With MIMD computing, there are multiple sets, $D_1$, $D_2$, $D_3$, $D_4$, and each data set respectively is fed into a separate processor, $I_1$, $I_2$, $I_3$, $I_4$, respectively.

The third method of parallel computing is multiple instruction, single data (MISD) computing, commonly known as a pipeline system, as shown in FIG. 4. In FIG. 4, data $D_1$, $D_2$, $D_3$, $D_4$, go into instruction set $I_1$, $I_2$, $I_3$, $I_4$. By the time data $D_1$ are processed in a first processor, $I_1$, the second data $D_2$ go into the first processor $I_1$, and the first data $D_1$, having been processed by the first processor $I_1$, go into the second processor $I_2$. MISD computing can contribute to the overall efficiency only when there are at least two (2) input instances to the pipe intake with maximal k times speedup where k is the number of pipe stages. SIMD computing is the most effective approach to parallel processing since every computing bound program must have at least one repetitive segment which consumes most of the time and may be vectorized.

In D. Gelernter, "GETTING THE JOB DONE", BYTE, Nov. 1988, pp. 301–6, the concept of a tuple space is developed, where data are put into a virtual bag of tuples, as shown in FIG. 5. In the approach employed by Gelernter using a system called Linda, all of the computers of the Linda system are loaded with some computing intensive subprograms, i.e., workers, and the computers access the tuple space looking for work to perform, in a manner similar to SIMD computing.

SUMMARY OF THE INVENTION

A general object of the invention is a multicomputer system and method for parallel execution of application programs.

Another object of the invention is to construct a scalable, fault tolerant and self-scheduling computer architecture for multi-computer systems.

According to the present invention, as embodied and broadly described herein, a multicomputer system and stateless computing method are provided for use with a plurality of computers and a backbone. The multicomputer system is thus called stateless machine (SLM). The SLM backbone has a unidirectional slotted ring structure but can be simulated, with less efficiency, by any interconnection network that provides point-to-point, broadcast and EXCLUSIVE-READ operations. Conventional networks, such as multibus systems and shared memory systems as well as local and wide area networks, can also function as a SLM backbone without the multi-media capability by a software implementation of a tuple space. The SLM backbone may use most types of medium for interconnecting the plurality of computers.

At least one of the computers, and in general several computers, sends labeled messages, in data packets, over the SLM backbone. The messages may be sets of instructions $I_1$, $I_2$, $I_3$, $I_4$, . . . , or sets of data, $D_1$, $D_2$, $D_3$, $D_4$, . . . At initialization, each computer receives a full set of partitioned segments belonging to one application program. Each program segment, or a subset of a partitioned program, consumes and produces labeled data messages. A computer having no work to perform is considered to be sitting idle. The first computer encountering a message that matches the requirements of a program segment may exclusively receive that message. The program segment on the first computer is enabled when all required labeled data messages are received.

When the first computer generates new data, they are sent as new data messages which may activate many other computers. This process continues until all data messages are processed.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
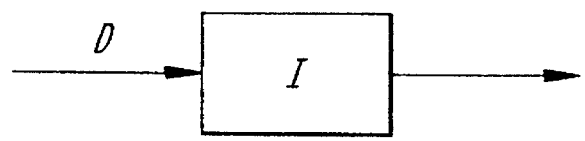
FIG. 1 illustrates a single instruction, single data machine.
Figure 2:
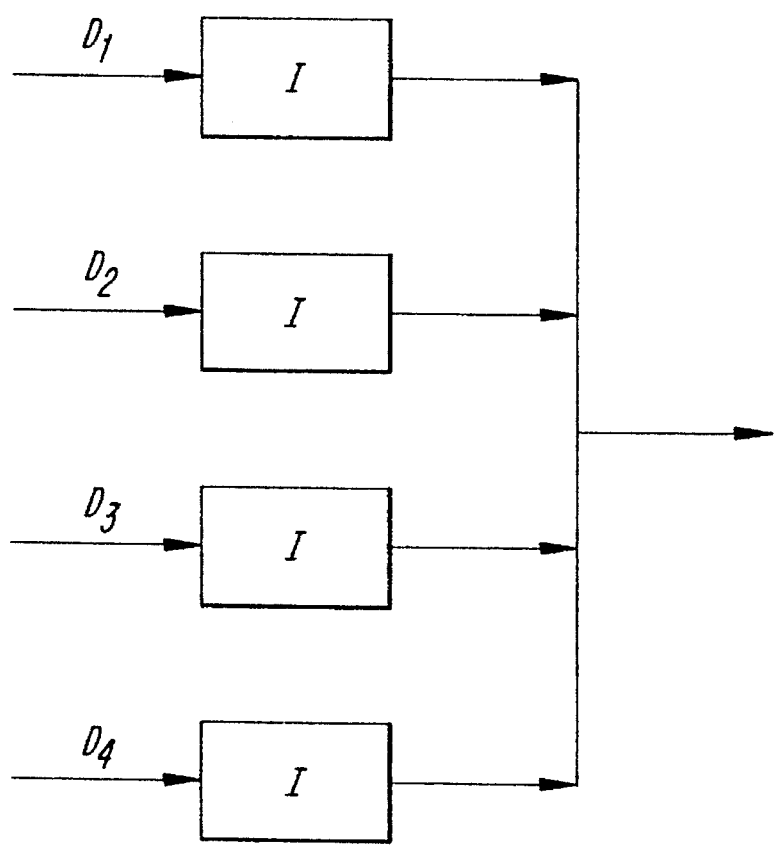
FIG. 2 illustrates a single instruction, multiple data machine.
Figure 3:
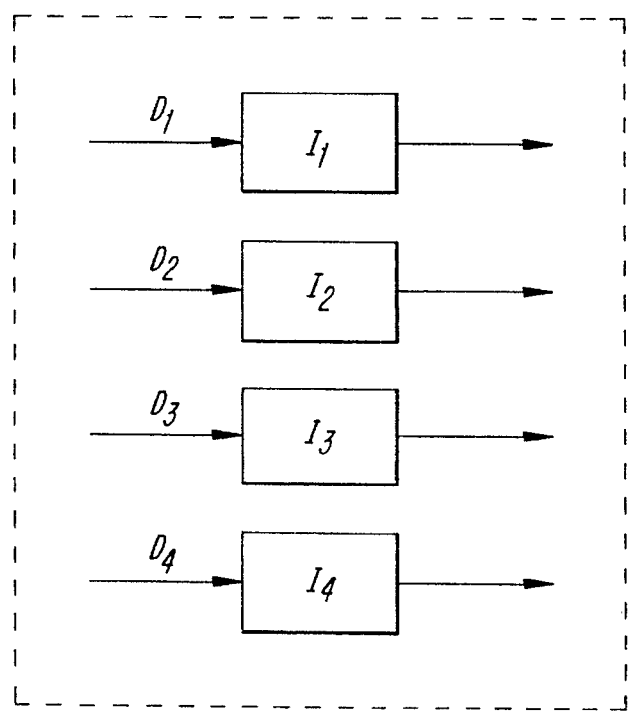
FIG. 3 illustrates a multiple instruction, multiple data machine.
Figure 4:
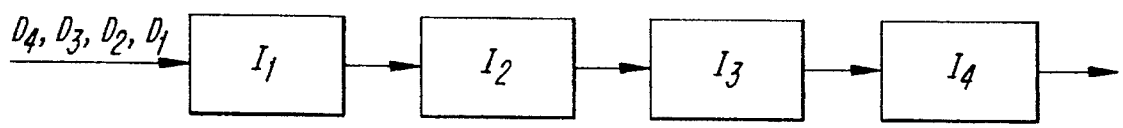
FIG. 4 illustrates a multiple instruction, single data machine.
Figure 5:
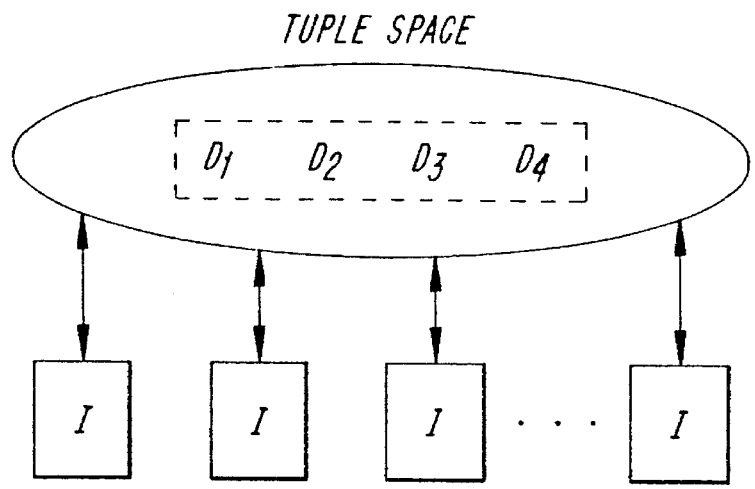
FIG. 5 illustrates a plurality of computing machines employing a tuple space.

Reference is now made in detail to the present preferred embodiments of the invention, examples of which are illustrated in the accompanying drawings, wherein like reference numerals indicate like elements throughout the several views.

The multicomputer system and method has a plurality of computers connected to a stateless machine (SLM) backbone. Each computer connected to the SLM backbone has a local memory for receiving data packets transmitted on the SLM backbone. The plurality of computers seek or contend to receive data packets, and thus receive messages, from the SLM backbone.

The backbone READ and WRITE operations on each SLM computer are independent of the computer's processor functions. A condition may exist where the SLM backbone becomes saturated with data packets, i.e., all the slots on the SLMbackbone are full of data packets. The saturation will be automatically resolved when some computers become less busy. If all computers stay busy for an extended period of time, adjustments to the computer processing powers and local write-buffer sizes can prevent or resolve this condition.

Definitions

A computer is defined as a device having a central processing unit (CPU) or a processor. The computers in a SLM system may be heterogeneous and homogeneous, and each computer has a local memory and optional external storage. Each computer preferably has more than 0.5 million floating point operations per second (MFLOPS) processing power.

A SLM backbone is defined as having a unidirectional slotted ring structure or simulated by any interconnection network that can perform or simulate point-to-point, broadcast and exclusive-read operations. The network can use fiber optical or copper cables, radio or micro waves, infrared signals or any other type of medium for communicating.

A stateless machine is one which employs a non-connection oriented communication method between processors. The disclosed invention uses a connectionless or stateless communication method in the sense that the sender(s) does not need to know the identity of the receiver(s). Using this approach, the state of a computation or program is kept in the backbone or the interconnection network. While "connectionless" may be a more familiar term for communications engineers, and may serve to better distinguish the present invention from the conventional concept of connection-oriented or point-to-point inter-processor communication relied upon in traditional multi-processor systems, "stateless" is used herein for the benefit of computer engineers. For the purposes of this patent, however, both terms may be considered synonomous.

A message is defined to be a labeled information entity containing one or more data packets. A message may include at least one set of instructions or data. The term 'data tuple' is used to refer to 'labeled message'. The set of instructions operates on at least one set of data.

A data packet is defined to be a limited number of bits containing useful information and a label for program segment matching purpose. A data packet is the basic building block for transmitting messages through the SLM backbone.

A broadcast is defined to be a communication originating from a network device, to all the other network devices. A network device typically includes a computer; however, any device in general may be connected to the SLM backbone.

A multicast is defined to be a communication originating from a network device, to group of selected network devices with a specially arranged addresses. Throughout the following description of the invention, the term "broadcast" is used for identifying both broadcasts and multicasts unless indicated differently.

SLM Multicomputer Architecture and Method

The SLM multicomputer system is a multicomputer processor architecture for providing a solution to problems in multi-processor (multi-CPU) system in scheduling, programmability, scalability and fault tolerance. The following description is of the SLM architecture, operating principle and the designs for a SLM compiler and an operating system extension.

Figure 6:
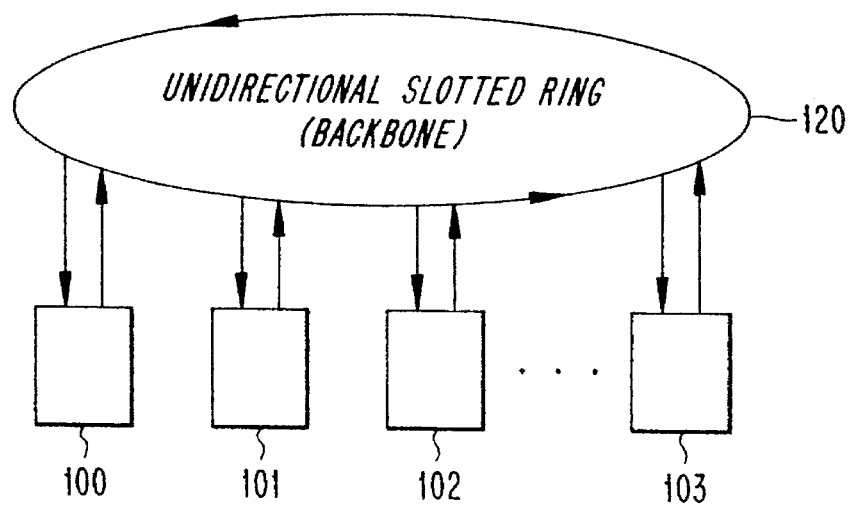
FIG. 6 illustrates the SLM architecture.

In the exemplary arrangement shown in FIG. 6, a multicomputer system and method are provided for use with a plurality of computers, and a SLM backbone 120.

The SLM multicomputer system uses the SLM backbone 120 as a medium for transmitting the plurality of labeled data packets corresponding to the message, for transmitting processed data packets, and for transmitting EXCLUSIVE-READ signals. The SLM backbone 120 may be a local area network or a wide area network, with the SLM backbone 120 using any type of medium for interconnecting the computers. The medium may be cable, fiber optics, parallel wires, radio waves, etc.

The SLM architecture is based on a parallel computing model called a Rotating Parallel Random Access Machine (RPRAM). The common bus for connecting parallel processors and memories in conventional Parallel Random Access Machine (PRAM) systems is replaced by a high speed rotating unidirectional slotted ring, i.e. the SLM backbone 120, in the RPRAM.

A SLM system operates according to the dataflow principle; i.e. every application program is represented as a set of labeled program segments, or a subset of an application program, according to the natural data dependencies and duplicabilities of the program segments. The only connections between the program segments are matching labeled data tuples. A SLM RUN command loads program segments to all computers. The sequential processing requirements of the original program are preserved by discriminating the EXCLUSIVE-READ operation from a READ operation. The SLM backbone 120 may transmit data tuples, embodied as labeled data packets, as initial data tuples of the application program, in the backbone. A computer completing the processing of a data tuple returns the results of the processing into the SLM backbone 120 in the form of new data tuples. A new set of computers may be triggered by the new data tuples to process the new data tuples, and the processing of initial and new data tuples continues until the application program is completed. The following discussion refers to program segments, with the understanding to one skilled in the art that the principles taught herein apply as well to a subset of a partitioned program.

The SLM multicomputer system executes an application program including a plurality of program segments, with each program segment labeled according to data dependencies or parallelism among the program segments, and with each program segment connected to other programs segments by a corresponding labeled data tuple. The SLM backbone 120, responsive to an execution command, transmits the labeled program segments to the plurality of computers to load the labeled program segments into each computer of the plurality of computers. The SLM backbone 120 also circulates the labeled data tuples through the plurality of computers. At least one of the plurality of computers, when it receives a matching set of data tuples, activates the program segment corresponding to the labeled data tuples, processes the activated program segments, and transmits on the SLM backbone 120 the results of the processing of the program segment as new labeled data tuples. The SLM backbone 120 continues to transmit the labeled data tuples to the plurality of computers and the plurality of computers continues to process the program segments corresponding to the labeled data tuples until the entire application program is processed.

Using the dataflow principle, a set of global data structures are read by processors to prepare for the execution of a subsequent mix of coarse grain SIMD, MIMD and MISD components.

A coarse grain processor vector or SIMD forms when a number of computers are activated upon the reading of vetorized data tuples, tuples of the same prefix, thereby triggering the same program segment existing on these computers. A coarse grain MIMD processor forms when different program segments are activated at the same time upon the reading of different data tuples. The output tuples of every computer automatically chain the acquiring computers into processor pipelines. If the application operates on a continuous flow of a data stream, the processor pipelines stabilize to provide an additional acceleration for the inherently sequential parts of the application.

Figure 7:
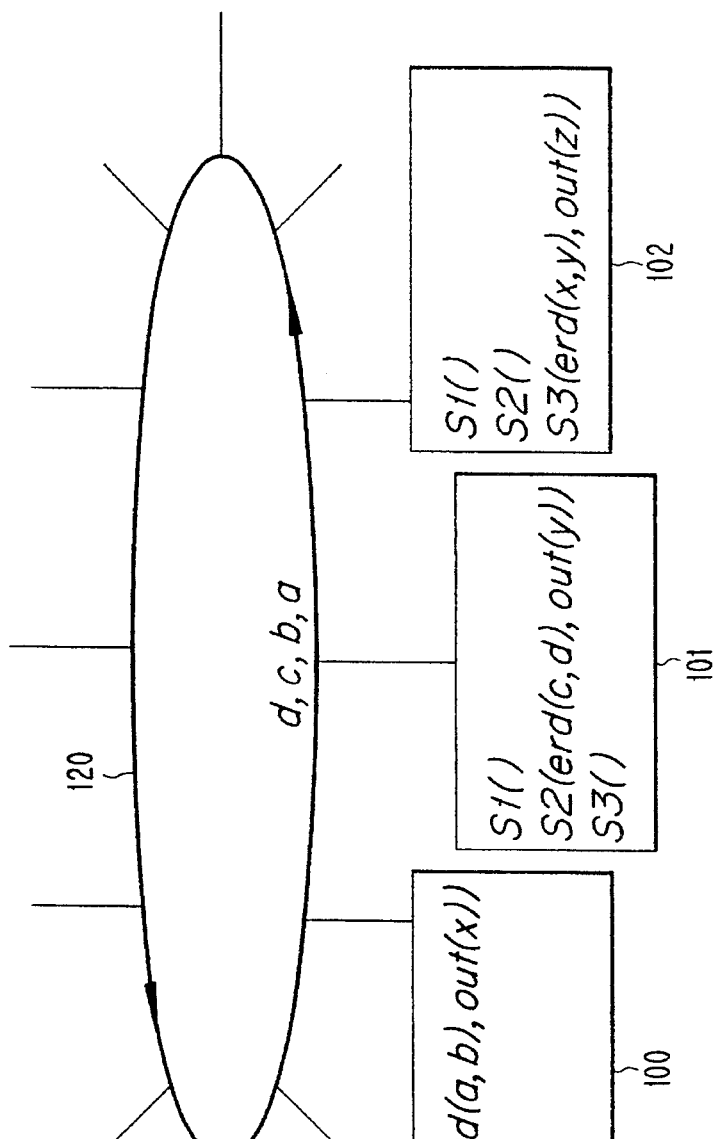
FIG. 7 is a MIMD data flow example.

FIG. 7 illustrates the formation of a coarse grain MIMD processor. In FIG. 7, with computers 100, 101, 102 coupled to the SLM backbone 120, computers 100, 101 execute program segments S1 and S2, respectively, in parallel as MIMD, followed by computer 102 executing segment S3. Note that all program segments in this example use the EXCLUSIVE-READ operation since the original dataflow does not have the sharing of data elements.

Figure 8:
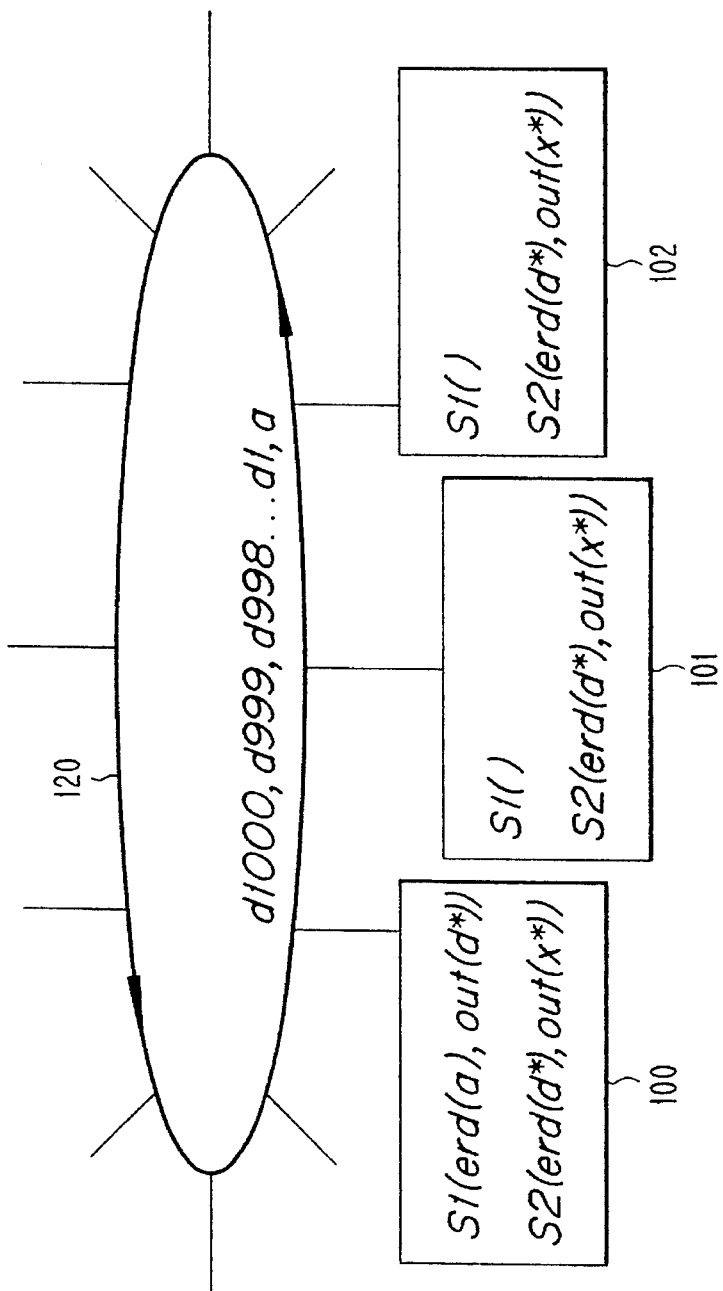
FIG. 8 is a SIMD component example.

FIG. 8 illustrates the formation of coarse grain SIMD processor. In FIG. 8, with computers 100, 101, 102 coupled to the SLM backbone 120, computers 100, 101, 102 execute program segments S1 and S2 in parallel as SIMD. Computer 100 exclusively reads tuple a, so segment S1 is executed only once on 100. Segment S1 generates 1000 vectorized tuples labeled as 'd1' to 'd1000', and triggers at least three computers (waiting for 'd*'s) to run in parallel in an extended version of conventional vector processors; i.e. an SIMD component. S3 may only be activated in one of the three computers due to EXCLUSIVE-READS.

Similarly, a set of sequentially dependent program segments executed by the computers of the SLM system may form a coarse grain processor pipeline. If the data tuples continue to be input, the pipeline may contribute to a potential speedup of computations.

Multiple parallel segments may execute at the same time and compete for available data tuples. Multiple backbone segments can transmit simultaneously. Labeled tuples may circulate in the backbone until either consumed or recycled.

The unidirectional high speed SLM backbone 120 fuses the active data tuples from local memories into a rotating global memory. The SLM backbone 120 circulates only active data tuples required by the processing elements at all times. Thus, if the overall processing power is balanced with the backbone capacity, the worst tuple matching time is the maximum latency of the backbone.

Using the system and method of the present invention, the multicomputer scheduling problem is transformed into a data dependency analysis problem and an optimal data granule size problem at the expense of redundant local disk space or memory space.

The parallelization of MIMD and pipeline segments is a natural product of the program dependency analysis. The parallelization of SIMD segments requires dependency tests on all repetitive entities (loops or recursive calls). For example, any upwardly independent loop is a candidate for parallelization. All candidates are ranked by the respective computing density of each candidate, with the highest priority being assigned to a unique loop being both dense and independent. If the number of SLM processors is greater than the number of the interactions of the highest prioritized loop, then a next priority loop may be parallelized; otherwise, the inner loops need not be parallelized. The parallelized loop uses a variable data granule size. Its adjustments affect the overall computing versus communications ratio in this loop's parallelization. A heuristic algorithm has been developed to adjust this size dynamically to deliver reasonable good performance. The best ratio gives an optimal performance. Recursive functions and procedures are parallelized using linear sub-trees with a uniformly controlled height. Adjusting the height can affect the computing and communication density; thus improving the balance of computing loads. In the above described manner, any sequential program may automatically distribute and parallelize onto the SLM architecture.

The SLM compilation is independent of the number of computers in a SLM system. A SLM compiler generates codes for execution regardless of the number of computers. Traditional parallel compilation difficulties; i.e. optimal partition, processor allocation, vector and pipeline constructions are decreased by letting active data tuples form the most effective pipelines and vectors automatically through the EXCLUSIVE-READ protocol over the SLM backbone, thus greatly improving the scheduling efficiency and programmability of multi-computer systems.

Since each computer processes at most one program segment at a time, a malfunction of one computer damages at most the work being done by one program segment, with the damage being reflected by lost data tuples. Detection of the lost data tuples by using time-outs and by re-issuing respective data tuples can restart the lost computation on a different processor to provide fault tolerance.

The best possible performance of a SLM system is determined by the proper adjustments scheduling factor value ($0<f<=1$) for vactorizable computing intensive segments. Application's natural structure also has an impact on performance. For example, an application having many duplicably decomposable segments performs better than the applications having few duplicably decomposable segments. Applications with wider range of data granule sizes would perform better than applications with narrow data granule ranges. The impact is most obvious when the SLM processor powers vary widely.

With the best possible program decomposition, the SLM backbone capacity and the aggregate computer power also limit the maximum performance deliverable by a SLM system for an application. The theoretical power limit of a SLM may be modeled by the following equation:

$$P = min\{(\Sigma P_i), CD \cdot min\{DD, K \cdot R\}\}$$

where:
P is the SLM theoretical performance limit in MFLOPS;
CD is the average computation density of an application in floating point operations per byte (FLOPB);
DD is the average data density of an application; i.e. total input, output, and intermediate data in millions of bytes preferably transmitted in one time unit (second);
K is the number of parallel rings, with K=1, 2, . . . 64;
R is the SLM ring capacity in MBPS; and
$P_i$ is the individual SLM processor power in millions of floating point operations per second (MFLOPS).

For example, in a SLM system having a single 10 MBPS ring, then R=10, and having 10 processors with an average $P_i$=20 MFLOPS, a computation with CD=100 FLOPB and DD=1 MBPS has a P=min $\{20\times10, 100\times min\{1, 1\times10\}\}$= 100 MFLOPS performance, with the performance being limited only by the transactions of the computation and the data densities. For a different application, if CD=1000 FLOPB, this SLM does not deliver 10 times more MFLOPS for the computation, it can only deliver at most P=min$\{20\times 10, 1000\times min\{1, 1\times10\}\}$=200 MFLOPS. The processors are the bottleneck to the computation. Similarly, if DD is greater than 10 MBPS, then the ring becomes the bottleneck of the computation.

With a 5 μs per kilometer delay and a 147 meter interval between computers, a distributed SLM system may include up to 10,000 computers with a maximum round trip latency less than 8 seconds. With 100 ns per computer delay, a 32,000 computer-centralized SLM system has a 3.2 millisecond maximum round trip latency. Any application requiring more than 10 seconds of computing time can benefit from either SLM.

The SLM software architecture includes a compiler and an operating system extension, and, in the preferred embodiment, every computer of the SLM system runs a multi-programmed operating system, such as Unix(tm), VMS(tm) and OS2(tm). The SLM compiler analyzes the data dependency and embedded parallelism; i.e. the sub-program duplicability, of a given sequential program. The SLM compiler generates a set of partitioned program segments and a program-segment-to-data-tuple mapping. The SLM operating system extension uses the mapping to provide a fast searchless tuple matching mechanism.

Abstractly, a SLM system is a data reduction machine that uses parallel processors to reduce the natural dataflow graph of a computer application. The embedded parallelism of the application is defined by the SLM compiler. The SLM architecture uses space redundancy to trade-off scheduling efficiency, programmability and fault tolerance in the present invention.

SLM Compiler

The SLM compiler is a sequential program re-structurer; i.e. the SLM compiler takes a sequential program description as an input in a specific programming language; for example, the C programming language. In use, the SLM compiler generates a set of distributable independent program segments in a desired language; and generates a data-tuple-to-program-segment matching table (DTPS_TBL). The distributable program segments and the DTPS_TBL are transmitted to all participating computers of the SLM system before the execution of the application program. The local SLM operating system extensions load the DTPS_TBL, and prepare each computer for a subsequent RUN command.

Figure 9:
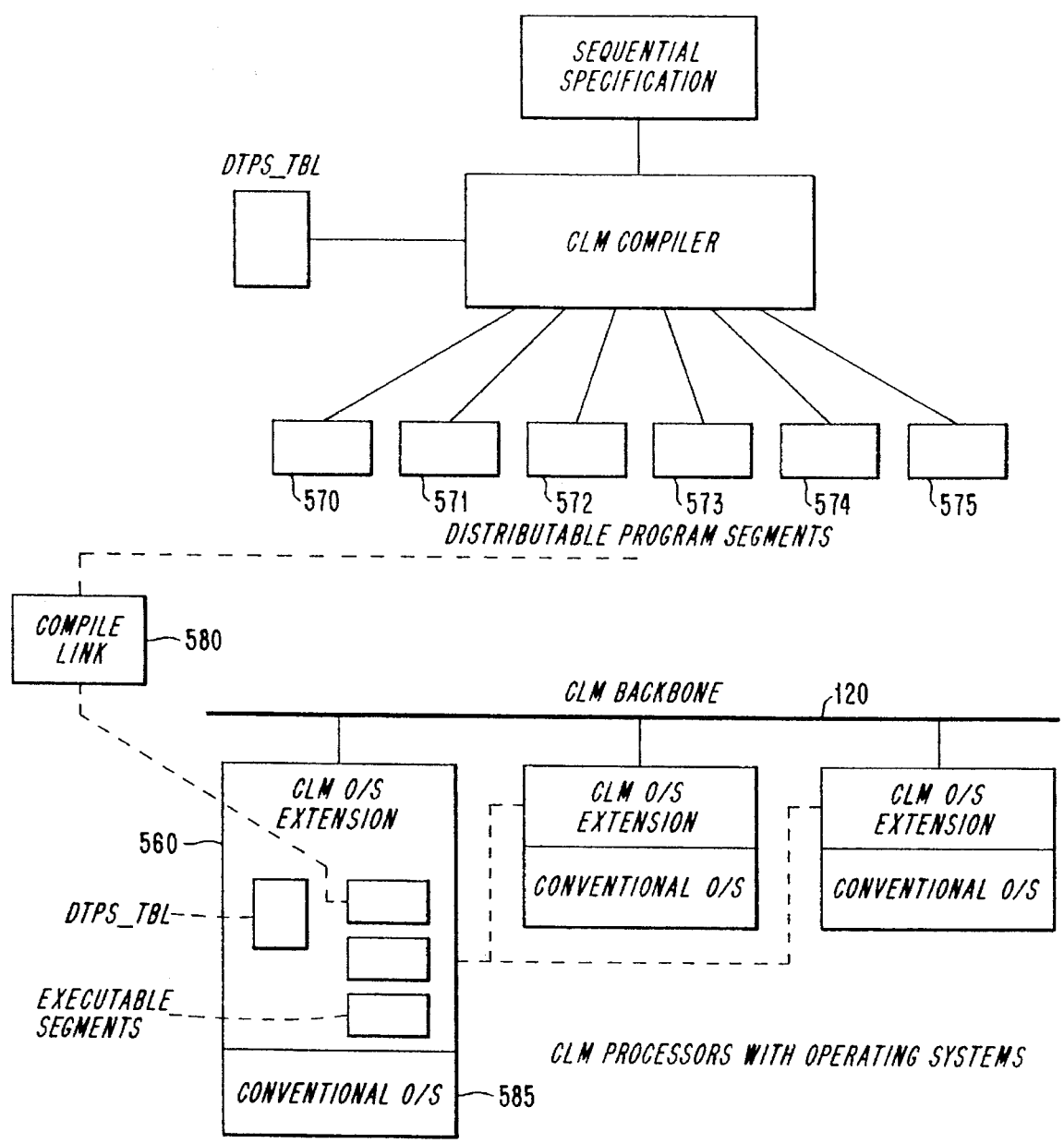
FIG. 9 illustrates a SLM compiler and operating system interface.

FIG. 9 illustrates the relationship between the SLM compiler 555 and the SLM operating system (O/S) extension 560.

The SLM 'run X' command sends application X's data tuples to all SLM processors through the O/S extension 560. The compile-link 580 means that the SLM compiler can optionally load the compiled programs 570–575 and DTPS_TBL onto SLM processors 570 immediately after compilation or leave the loading done by the RUN command.

A Force Copy (FC) directive is introduced to guide the SLM compiler to reduce the compilation time by skipping the dependency analysis. The FC directive has the following syntactical form:

```
                    FC { STATEMENT }
For example,
        FC { WHILE (! (X < Y))
               { X = SIN (Y) * 250.33;
                 ooo
               }
           }
```

Using C as the host programming language, the SLM compilation command at the operating system level has the following syntax:
CLCC SOURCE_PROGRAM_NAME
(—D DATA DENSITY THRESHOLD)
(—G DATA GRAIN SIZE)
(—P PIPELINE STAGE SIZE)
(—F FACTORING VALUE, $0<F<=1$, DEFAULT 0.5)
(—T Factoring threshold, mandatory if $F \leq 0$)
(—R RECEIVE TIME OUT VALUE IN SECONDS FOR RUNTIME FAULT DETECTION)
(—V DEPTH OF VECTORIZATION, WITH DEFAULT=1)

The —D option designates a data density threshold for determining the worthiness of parallelization of repetitive program segments. The —G option designates a grain size value for optimizing the difference. The —P option designates a pipeline stage size to guide the SLM compiler 555 in generating the sequential program segments to improve the performance if the intended program operates on a continuous stream of data. The —F option activates fault tolerance code generation. The —R option may impact the overall performance due to the extra overhead introduced in fault detection and recovery. The time-out value of —F may range from microseconds to 60 seconds. The —V option controls the depth of vectorization. A greater value of V may be used to obtain better performance when a large number of SLM processors are employed. The —F option defines the factoring percentage used in a heuristic tuple size estimation algorithm. The default value is 0.5. SLM compiler commands for other programming languages may have similar syntax structure.

Figure 10A:
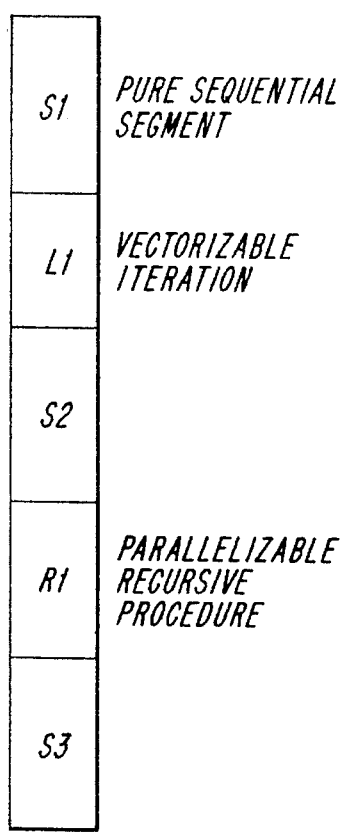
FIGS. 10A and 10B illustrates the SLM compilation principle.
Figure 10B:
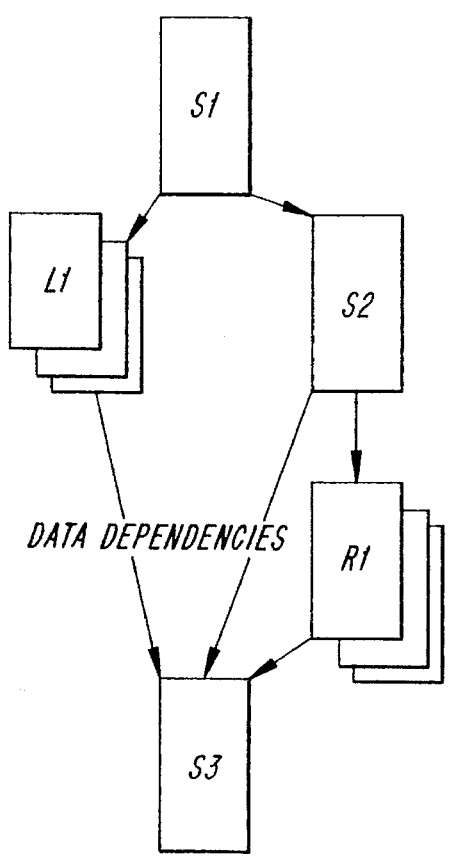

FIGS. 10A and 10B illustrate the SLM compiler operating principle. Every sequentially composed program, regardless the number of sub-programs, can be transformed into one linear sequence of single instructions. The repetitive segments, iterative or recursive, indicate the natural partitions of the program. Every partitioned segment can be converted into an independent program by finding input and output data structures of the partitioned segment. The repetitive segments may be further parallelized using the SIMD principle. For example, for an iterative segment, independent loop instances are considered duplicable on all SLM processors. Then a data vectorization is performed to enable the simultaneous activation of the same loop core on as many as possible SLM processors, i.e., dynamic SIMD processors. For a recursive segment, a recursive state tuple is constructed to force the duplicated kernels to perform a breadth-first search over the implied recursion tree.

In operation, the SLM compiler 555 operates in the following phases: Data Structure Initialization, Blocking, Tagging, L-block Vectorization, R-block Vectorization, and Code Generation.

1. Data structure initialization: if the input specification is syntactically correct, the data structure initialization phase builds an internal data structure to store all information necessary to preserve the semantics of the sequential program, including:
   a. data structures and types;
   b. procedures;
   c. functions; and
   d. sequential statements.

A linear list of statements for the main program body is the primary output of the data structure initialization phase. The list, all procedures and functions have been substituted in line.

2. Blocking: the blocking phase scans the linear statements and blocks the linear statements into segments according to the following criterion:
   a. All consecutively sequentially connected statements are grouped as one segment, including all assignments, conditional statements, and non-recursive procedures and functions.
   b. All statements included in a loop statement are grouped as one segment. Only the out-most loop is considered for grouping, and all inner-loops are considered as simple statements in the blocking phase.
   c. All statements included in a recursive function are grouped as one segment.
   d. All statements included in a recursive procedure are grouped as one segment.

3. Tagging: the tagging phase analyzes and tags each segment accordingly:
   S—for sequential segments;
   L—for loop segments; and
   R—for recursive functions or procedures.

4. L-Block Vectorization: the L-Block vectorization phase analyzes the duplicability of each L block, and performs the following tasks:
   a. Identify all nested loop within each L block and label each nested loop.
   b. Loop maximization: the L-Block vectorization phase may optionally attempt to order the number of iterations of all loops to form a descending sequence by flipping the independent loops.
   c. Perform the following tasks for each loop, beginning from an outer to an inner loop:
      i. If a loop contains file input/output statements, mark the loop as non-duplicable and exit the current task;
      ii. If a loop is a WHILE loop, translate the WHILE loop into a FOR loop, if possible. Otherwise, if the loop is not a FC block, mark the loop as non-duplicable and exit the current task;
      iii. If either lower or upper bound of the loop is a variable and if the loop is not a FC block, then mark the loop as non-duplicable and exit the current task;
      iv. Conduct a dependency test, and mark the loop as non-duplicable if at least one statement in the loop body is dependent on the execution results for a previous loop. Anti-dependency is considered duplicable;
      v. Calculate the computational density D of the L block by counting the number of fixed and floating point operations, including the inner loops. If D is less than a threshold specified by the —D option at the compilation command line, and if the block is not a FC block, then mark the L block as non-duplicable and exit the current task; and
      vi. Mark the L-block duplicable and exit the current task.
   d. Starting from the outermost loop, mark the Vth loop as an SIMD candidates, with V specified at compilation time and with a default=1.

5. R-Block Vectorization: the R-block vectorization phase is responsible for analyzing the duplicability of recursive functions and procedures by performing the following tasks:
   a. Identify all nested procedures and functions and label the nested procedures and function.
   b. Perform the following task for each nested recursire procedure or function:
      i. If at least one of the call parameters is updated in the function or procedure body, then mark the nested procedure/function as non-duplicable and exit the current task;
      ii. Calculate the computation density D of the R-block by adding the number of fixed/float point operations per recursire execution. If D is less than a threshold specified by the —D option at the compilation command line, then mark the R-block as non-duplicable and exit the current task; and
      iii. Mark the R-block duplicable and exit the current task.

6. Code Generation: the code generation phase furnishes the decomposable program segments into independently compilable programs:
   a. S-Block processing is performed for enhancing the efficiency of the potential processor pipelines if the intended program is to operate on a continuous stream of data, as specified by the presence of the —P option at compilation command. Each S-block is inspected for the total number of statements contained in the S-block, and all S-blocks are to be spliced into segments less than or equal to the value given by the —P option.

b. Formalize the tuple requirements for each S/L/R block by the following steps:

i. Collect all data structures required by the statements of each block, including all global data structures and parameters if the block is a function/procedure block;

ii. Collect all data structures returned by each block. The returned data structures include all global data structures referred on the left-hand-side of all statements in the block and the modified parameters returned from functions/procedure calls;

iii. Formulate tuples: the formulation of tuples process starts from the output of each block. For each block, the optimal number of output tuple equals to the number of sequentially dependent program segments, thereby preserving the original parallelism by retaining the separation of data tuples;

iv. Assign names to all program segments, with the assigned names being the sequential program name plus the block type plus a block sequence number.

v. Assign tuple names: every output tuple is assigned a tuple name. The tuple name consists of the sequential program name, the block name, and the first variable name in the collection of output variables. The assigned names are to be propagated to the inputs of all related program segments;

vi. Exclusive-read treatment: for every data tuple read by each block, (a). If the data tuple is to be read by at least one other block, and never modified by any block, mark the reading of the data tuple as non-exclusive.

(b). If the data tuple is to be read only by a block, mark the reading of the tuple exclusive.

Figure 11A:
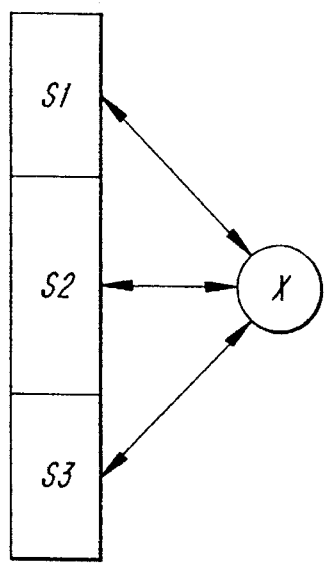
FIGS. 11A and 11B illustrates the concept of serialization of global variable updates.
Figure 11B:
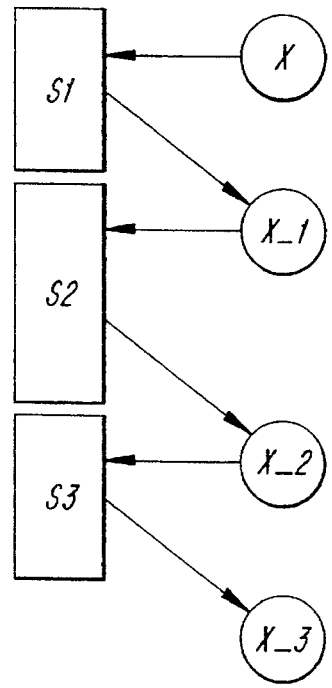

(c). If the data tuple is to be read and modified by many blocks. For example, variable X is modified by three blocks: S1, S2 and S3. If the <S1,S2,S3> is the original sequential order, then introduce new variables X_1, X_2 and X_3. X is to be EXCLUSIVE-READ by S1. The modification will be stored in X_1. X_1 will be EXCLUSIVE-READ by S2 with updated value in X_2. The similar process happens to S3. X_1, X_2 and X_3 assume the same definition as X. FIGS. 11A and 11B illustrate tuple update serialization involving multiple blocks.

c. L-block slicing: each SIMD each L-block is further spliced into two sections: a master section and a worker section. The master section contains statements for scattering the vectorized data tuples and for gathering the resulting data tuples. The globally referenced data structures in worker section are structured as READ tuples in the worker code. The vectorized tuples are scattered in G groups, where G is calculated according to the following loop scheduling algorithm, developed based on "Factoring—A Method for Scheduling Parallel Loops," by S. F. Hummel, E. Schonberg and L. E. Flynn, Communications of ACM, Vol., No. 8, 90–101, August 1992. The disclosing loop scheduling algorithm was developed based on the algorithm published in, "A Virtual Bus Architecture for Dynamic Parallel Processing," by K. C. Lee, IEEE Transactions on Parallel and Distributed Systems, Vol. 4, No. 2, 121–130, February 1993. K. C. Lee discussed a modular time-space-time network comprising multiple time division networks connected by a nonblocking space division network (switches). Except for the exclusive-read implementation, the rest is compatible with the multiple backbone SLM architecture.

P: total number of processors
N: total number of iterations
$f(0<f<=1)$: the scheduling factor, default 0.5.
T: the termination threshold
$R_j$: the $j^{th}$ remaining iterations
$S_j$: $j^{th}$ tuple size (G)

The tuple size G ($S_j$'s) is defined as follows:
$R_0=N$,
$R_{j+1}=R_j-P*S_j=(1-F)*R_j$, or
$S_j=R_j * F/P$
until $S_j<T$.

The value of P can be automatically determined by the SLM backbone management layer and transmitted to the program at execution time. The value T is from the —T option at the compilation command line. The worker section is padded with statements for retrieving tuples in the beginning of the worker section, and with statements for packing the results into new tuples at the end of the worker section. The new spliced segments are distinguished by suffixes M and W respectively.

Figure 12:
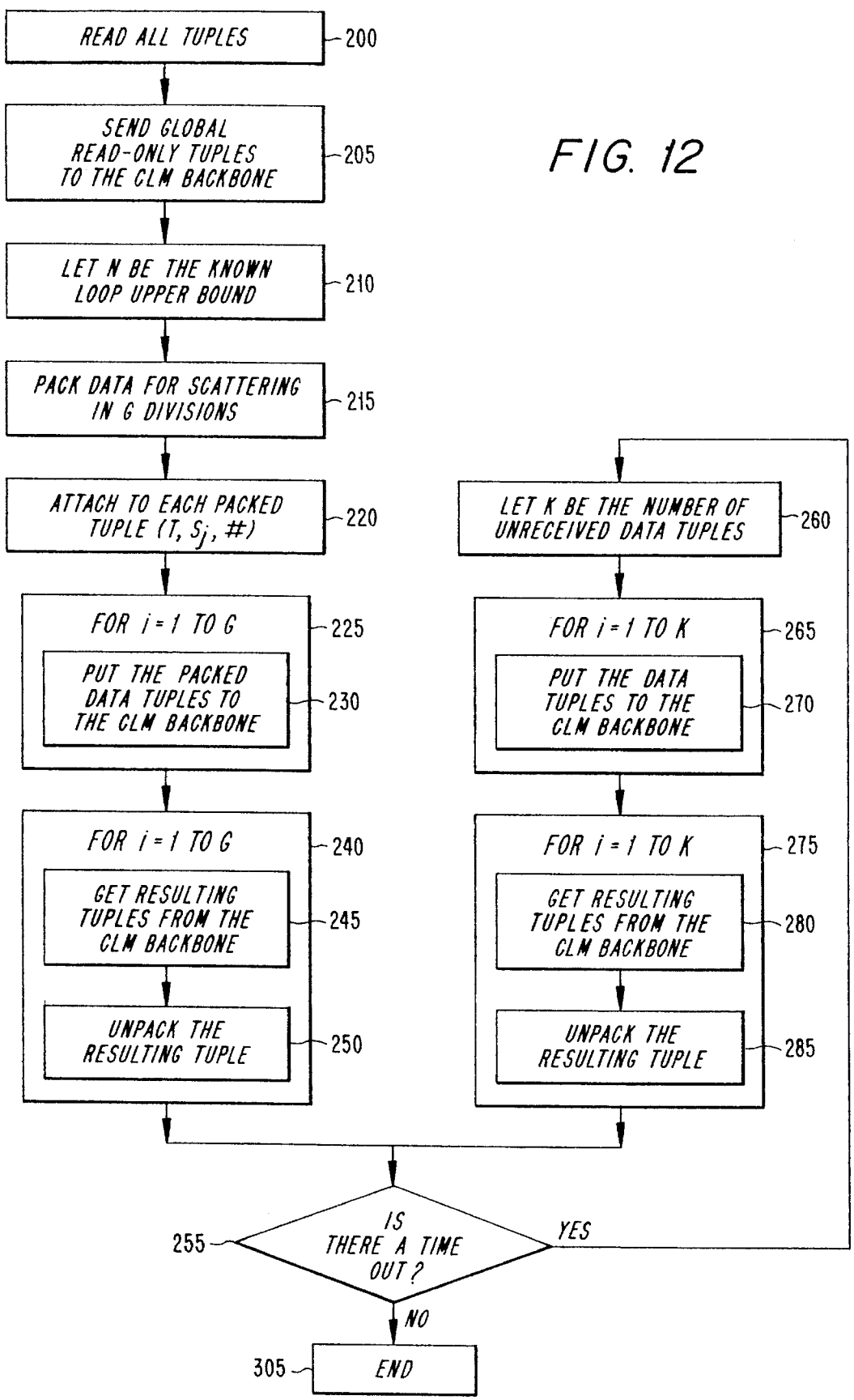
FIG. 12 shows a L-block master section procedure.

As shown in the flowchart in FIG. 12, the master section performs the reading and getting 200 all the necessary data tuples according to initial data dependencies; sending 205 globally read-only tuples to the backbone for the workers; calculating 210 the vectorized data tuples according to the factoring algorithm described above; packing 215 data according to Sj's; attaching 220 to each packed tuple (T,Sj,#) where T is the partition threshold value, Sj is the tuple size and # is the packing sequence number amongst N iterations; looping 225 for i=1 to G to put 230 the packed data tuples to the backbone; looping 240 for l=1 to N to get 245 the result from the backbone and unpack 250 the results from the backbone; if the fault tolerant option R is greater than zero, then checking time out 255; otherwise the master terminates. The fault tolerance option includes the steps of letting 260K be the number of unreceived result tuples which is calculated from the differences between scattered data tuples and received results; looping 270 for i=1 to k to re-put 275 data tuples to the backbone; looping 280 for i=1 to k to get 285 and unpack 290 the result tuples; and looping 255 to continue the fault tolerance option if there are more time-outs. Otherwise, the master section ends 300.

Figure 13:
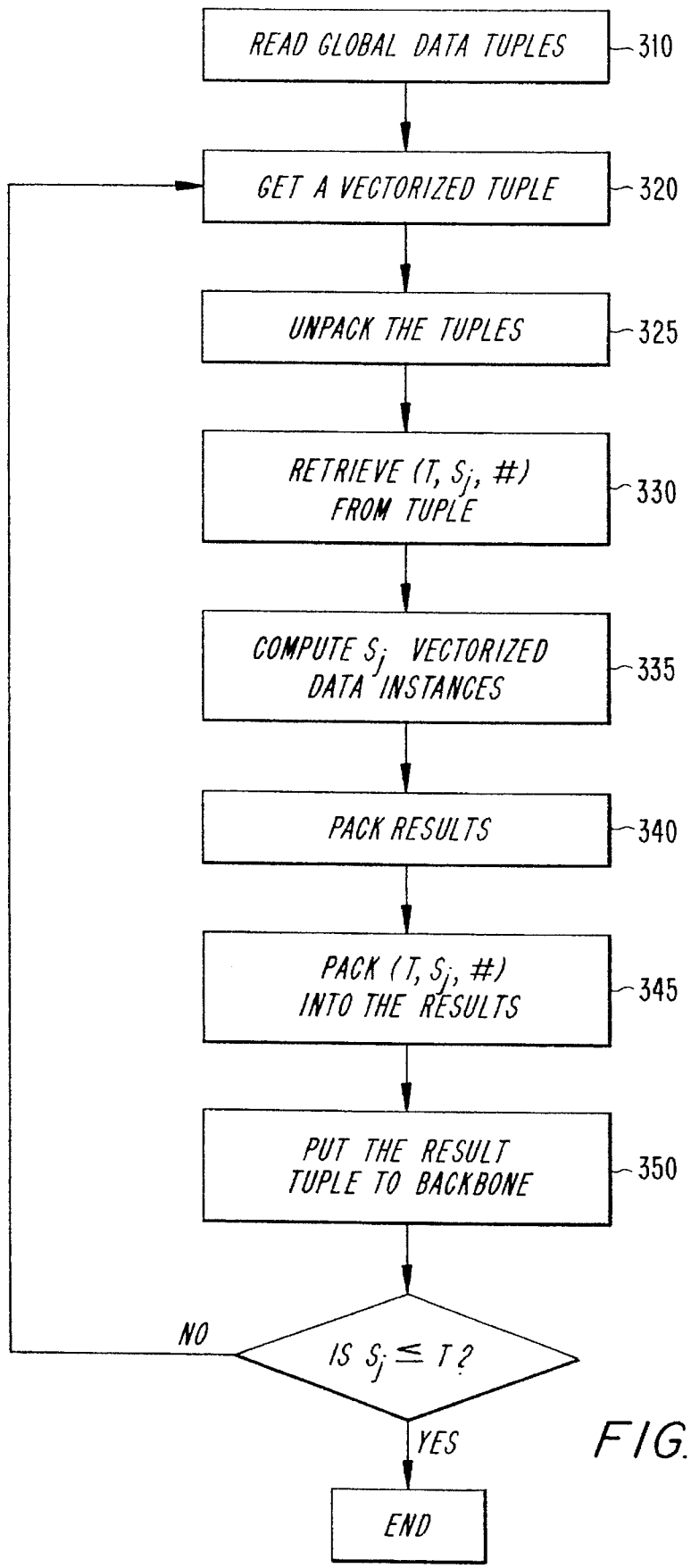
FIG. 13 shows a L-block worker section procedure.
Figure 14:
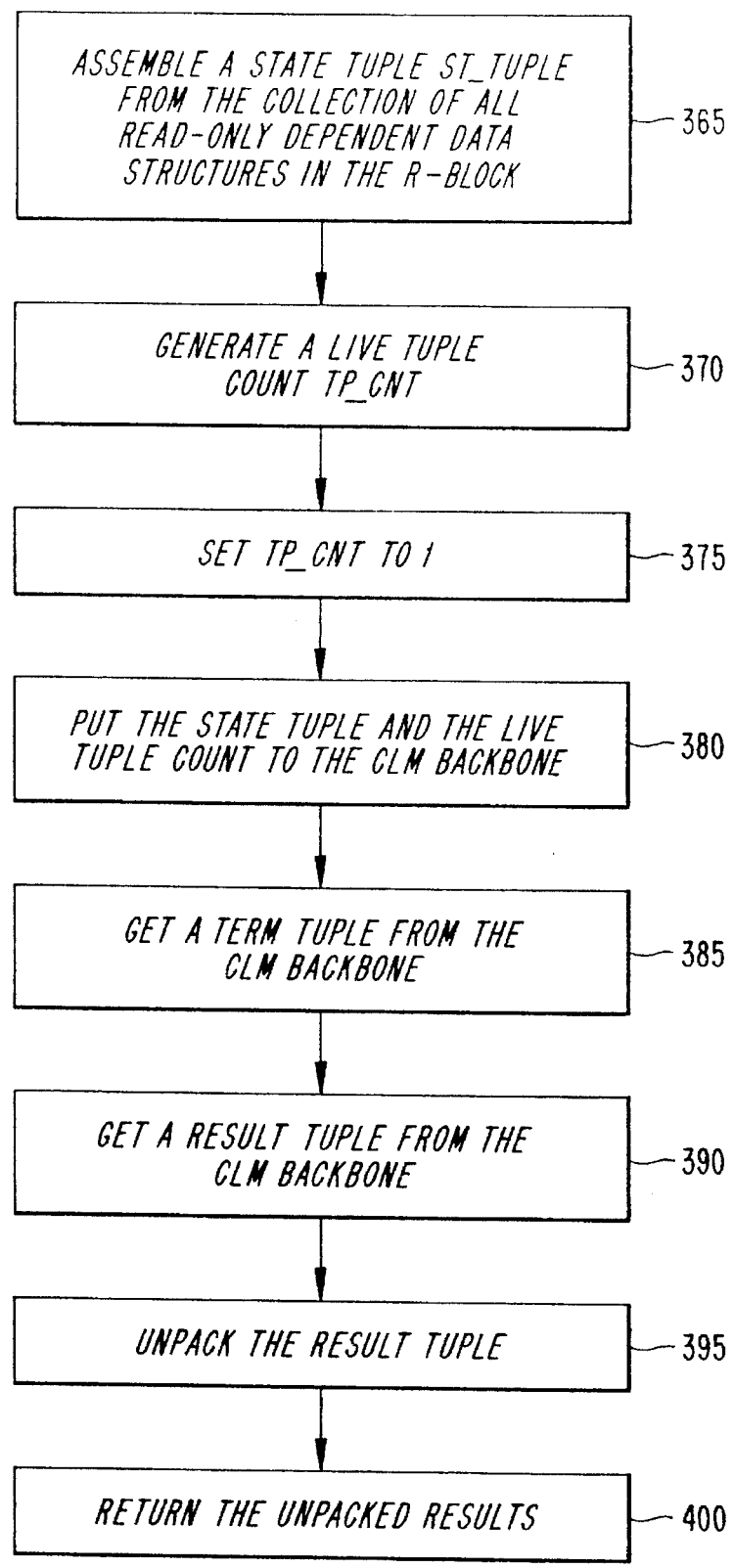
FIG. 14 shows a R-block master section procedure.

As shown in the flowchart in FIG. 13, the worker section performs the reading 310 of global data tuples; getting 320 a vectorized tuple; unpacking 325 the received tuple; retrieving 330 (T,Sj,#) from the tuple; computing 335; packing 340 the results; packing Sj pieces of vectorized data, 335 (T,Sj,#) to the result tuple; putting 350 the result tuple to backbone; checking 355 if Sj>T then loop back to get a vectorized tuple 320; otherwise ending 360.

d. R-block tuplization by tree slicing: each duplicable R-block is spliced into two sections: the master section and a worker section. The master section contains statements for generating an initial state tuple and a live tuple count TP_CNT, with TP_CNT initially set to 1. The initial state tuple is a collection of all data structures required for subsequent computation. The master section also has statements for collecting the results. As shown in FIG. 14, the master section operates using the procedure of assembling 365 a state tuple from the collection of all read-only dependent data structures in the R-block, with the state tuple ST_TUPLE=(G, d1, d2, . . . dk)

where G is the grain size given at compilation time using the —G option. The master section also creates a result tuple using the globally updated data structures and return data structures via syntactical analysis of the recursion body. It puts the result tuple into the backbone. The master section generates 370 a live tuple count TP_CNT; sets 375 the live tuple count TP_CNT to 1; puts 380 the state tuple and the live tuple count to the SLM backbone 120; gets 385 a term tuple from the SLM backbone 120; gets 390 a result tuple from the SLM backbone 120; unpacks 395 the result tuple; and returns 400 the unpacked results.

Figure 15:
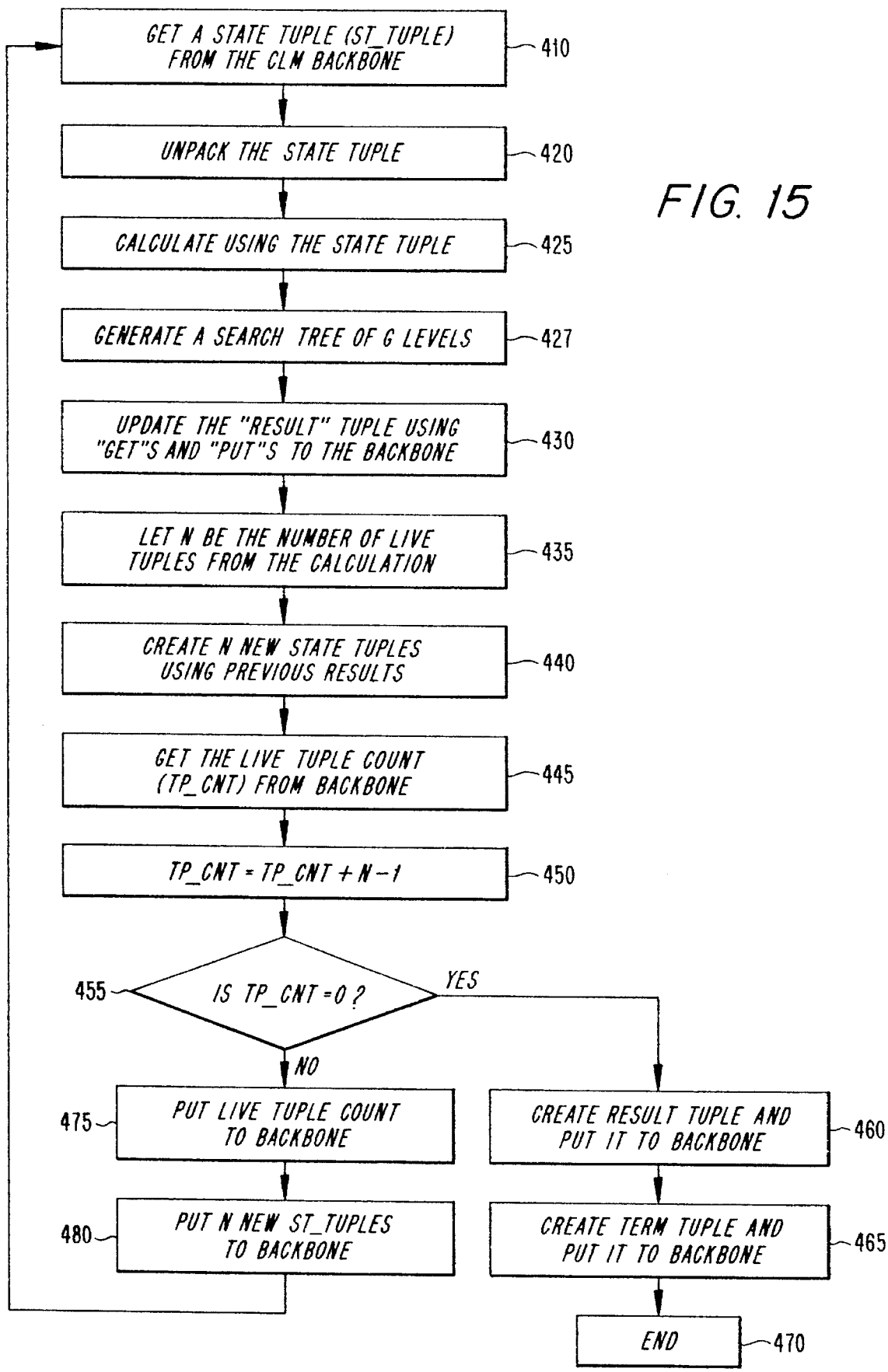
FIG. 15 shows a R-block worker section procedure.
Figure 16:
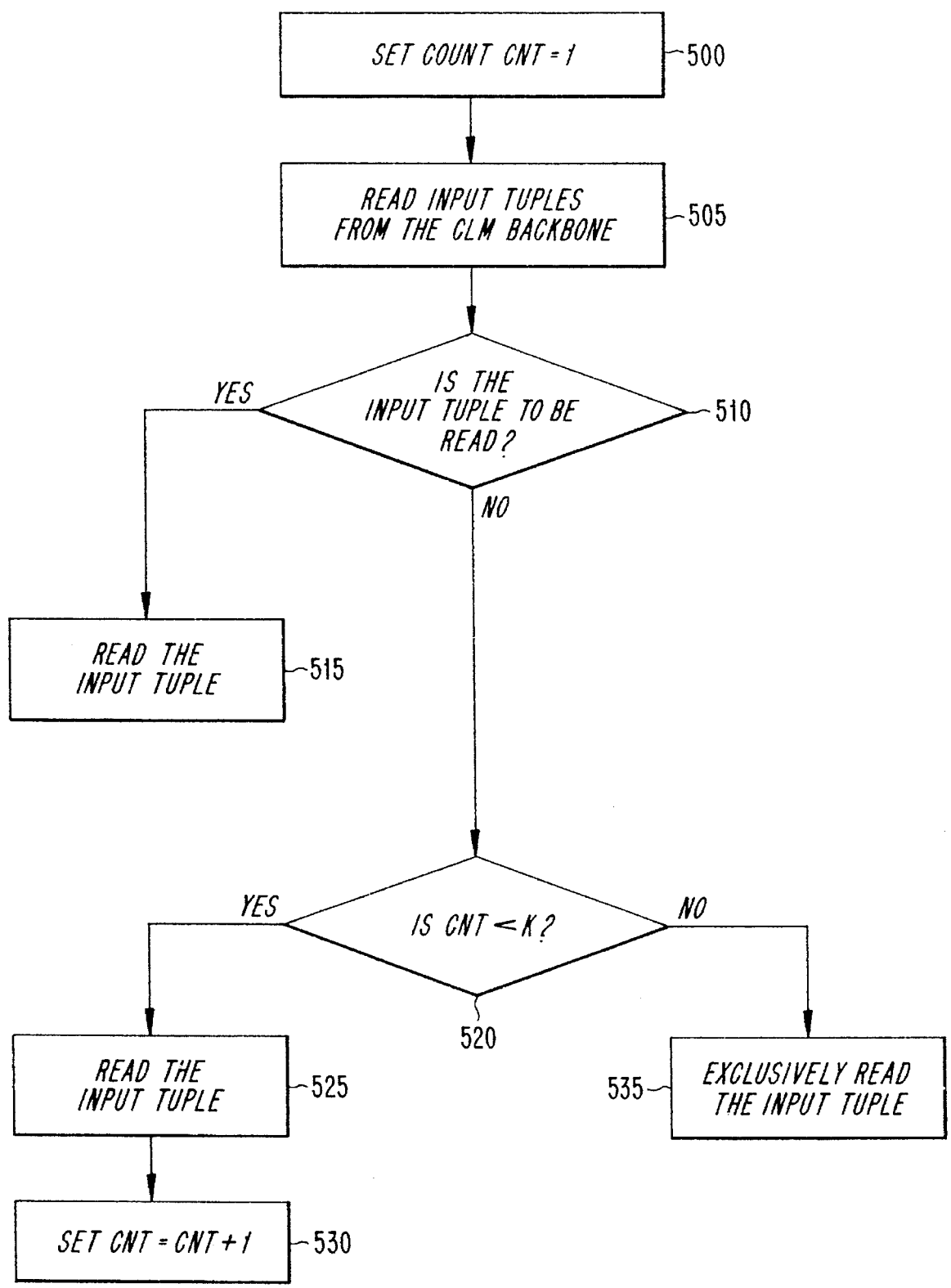
FIG. 16 illustrates an exclusive-read deadlock prevention protocol.

As shown in FIG. 15, the worker section gets 405 the state tuple ST_TUPLE from the SLM backbone 120; unpack 410 the state tuple calculates 415 using the state tuple; generate 420 a search tree of G levels. The worker section also updates 425 the result tuple during the calculation via exclusive-reads and writes to the backbone. It then creates 440 N new state tuples according to the results of the calculations. It gets 445 TP_CNT from the backbone and sets it to TP_CNT+N−1. If TP_CNT becomes 455 zero, then it creates 460 a "term" tuple and puts it into the backbone. Otherwise, it puts 475 N new state tuples into the backbone and loops back to the beginning.

e. Perform fault tolerance treatment of the L-blocks, R-blocks, and S-blocks by the following.

a) for each program segment, in addition to its own reads, add data tuple reads to all predecessor's read tuples and EXCLUSIVE-READ tuples with a 'R'-prefix (the rescue-tuples)

b) for each program segment add data tuple writes immediately, with a 'R'-prefix, after reading the input tuples.

c) add a time-test code segment to every input tuple read. The time-out code writes the corresponding rescue-tuple to the SLM backbone. Then go to the tuple read again.

f. EXCLUSIVE-READ deadlock prevention, with the prevention performed by processing the multiple-EXCLUSIVE-READ-blocks. For every block having K exclusive-read input tuples, with K>1, implement the protocol as shown in FIG. 16, where a count CNT is set 500 to equal 1; input tuples are read 505 from the SLM backbone 120; check 510 if the input tuple is to be read, as opposed to being exclusively read. If the input tuple is to be read, the input tuple is read 515. Otherwise, check 520 if the input tuple is to be exclusively read and if the count CNT is less than K. If the input tuple is to be exclusively read and count CNT is less than K, then the input tuple is read 525 and the count is incremented by setting 530 CNT equal to CNT+1. However, if the input tuple is to be exclusively read but the count CNT is greater than or equal to K, the input tuple is exclusively read 535. The procedure illustrated in FIG. 16 prevents possible deadlocks when K exclusive tuples are acquired by L different program segments on L computers, with L>1, with the deadlock resulting in no exclusive tuples progressing.

g. Map generation: For each program segment, generate the initial input tuple names and mark the initial input tuple names with RD to be read, or ERD to be exclusively read. For spliced L and R segments, the initial input tuples in the map should NOT contain the tuples belonging to the gathering parts, such as 245 and 285 in FIG. 12 and 385 and 390 in FIG. 14. These tuples are to be enabled after the completion of the scattering part. Store the information to a file having a name in the form of

APPLICATION NAME+MAP.

SLM Operating System Extension

Figure 17:
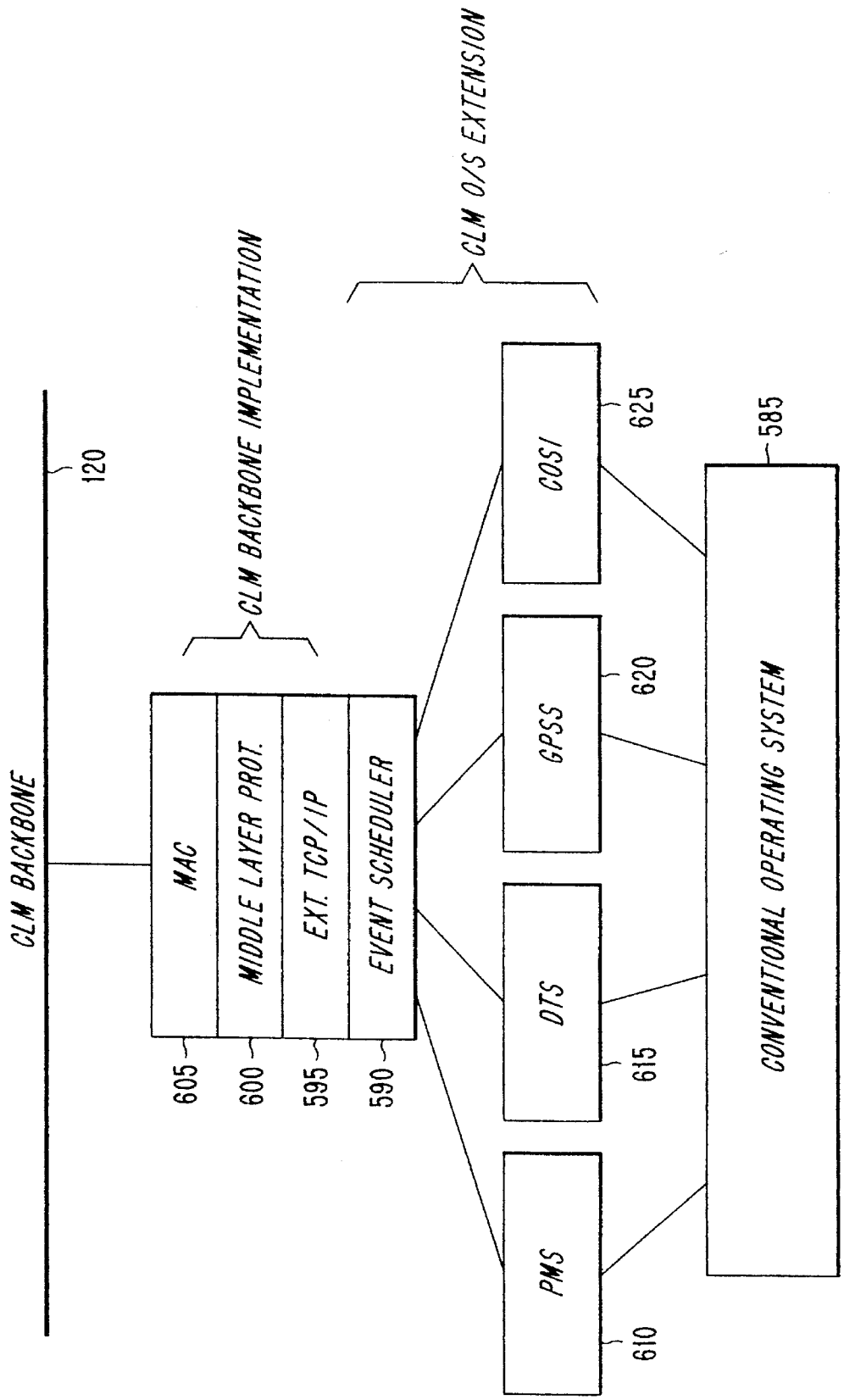
FIG. 17 shows a SLM operating system extension.

With each processor running multi-programmed operating system kernel; for example, UNIX™, VMS™ or others operating systems, the SLM O/S extension 560, as shown in FIG. 17, contains the following elements:

1. Event Scheduler 585, being a program using SLM extended TCP/IP to interpret the network traffic. The Event Scheduler 585 branches into four different servers: a Program Management Server (PMS) 610, a Data Token Server (DTS) 615, a General Process Management Server (GPMS) 620, and a Conventional Operating System Interface (COSI) 625 upon receipt of every network message. Note that network messages must include the following groups:

a) Program execution command (point-to-point and broadcast): the RUN command.

b) Data token traffic.

c) General process management commands: KILL, SUSPEND, RESUME, STATUS and others.

d) Conventional operating system commands (point-to-point and broadcast), such as remote file access, terminal display, etc.

2. Program Management Server (PMS) 610 for storing, activating, and removing partitioned SLM program segments. The program storage and removal functions act as a simple interface with existing O/S file systems. After receiving an activation command or a RUN command for an application program, the PMS builds a memory image for every related segments:

Trigger Tuple Name Table, (extracted from DTPS TBL, 127 entries);

Disk address of the segment, (1 entry);

Data Area* (v); and

Instruction Area* (^).

If the local memory is limited, the segment image can contain only the Trigger Tuple Name Table and The Disk Address entry. Similar to a demand paging concept, the segment with a matching tuple is fetched from local disk to local memory. The trigger tuple name table size is adjustable at system generation time. It also creates an indexed table (MTBL) from DTPS_TBL to the newly created segment images according to the referenced tuple names.

3. Data Token Server (DTS) 615, for matching the received data tuple, as a data token, with the DTPS_TBL. Whenever a backbone match is made, it marks all related program segments' trigger tuple name table entries using MTBL. If a complete trigger is found for any program segment, computer control is handed to the respective program segment.

4. General Process Management Server (GPMS) 620, for managing the KILL, SUSPEND, and RESUME commands, as well as general process status (GPS) commands for the SLM processes. Since there is only one segment executing at any time on the local processor, this is a simple interface with the conventional operating system using the information from DTPS_TBL.

5. Conventional Operating System Interface (COSI) 625, for intercepting all commands of the conventional operating system 585, and relays the convention operating system commands to the running kernel.

Figure 18:
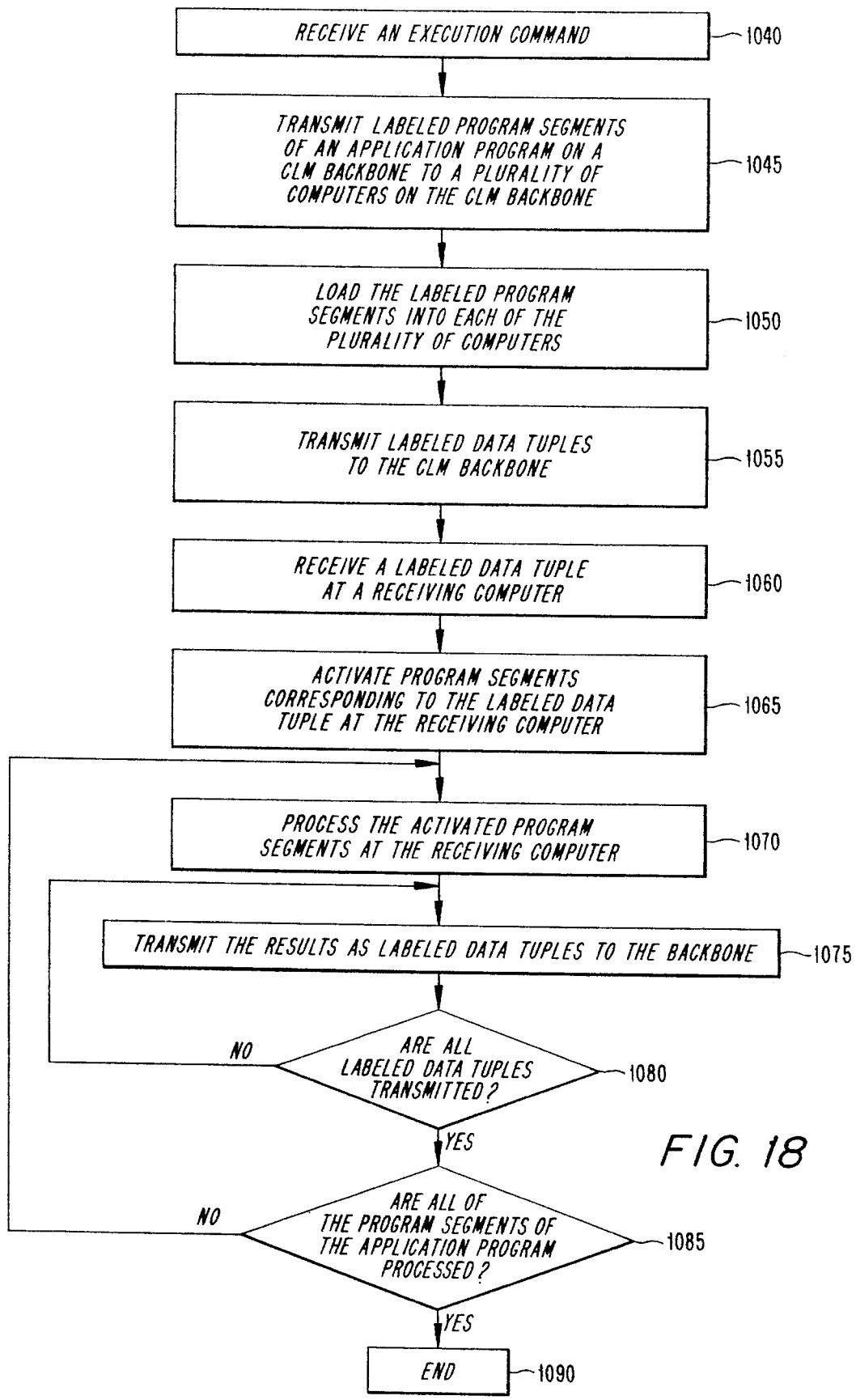
FIG. 18 illustrates a method of the present invention for processing and executing application programs.

The present invention uses a method for executing an application program including a plurality of program segments, with each program segment labeled according to data dependencies and parallelism among the program segments, and with each program segment connected to other programs segments by corresponding labeled data tuples. As shown in FIG. 18, the method includes the steps of receiving 1040 an execution command; transmitting 1045, on the SLM backbone 120, the labeled program segments to the plurality of computers; loading 1050 the labeled program segments into each computer of the plurality of computers; transmitting 1055, on the SLM backbone 120, the labeled data tuples to the plurality of computers; receiving 1060, at a receiving computer, a labeled data tuple; activating 1065, at the receiving computer, in response to the labeled data tuple, the program segments corresponding to the labeled data tuple; processing 1070, at the receiving computer, the activated program segments; transmitting 1075, on the SLM backbone 120, the results of the processing of the program segments as labeled data tuples; continuing 1080 to transmit, on the SLM backbone 120, the labeled data tuples to the plurality of computers; and continuing 1085 to process, at the plurality of computers, the program segments corresponding to the labeled data tuples until the entire application program is processed.

SLM IMPLEMENTATION

This section exhibits a conceptual implementation of SLM and its possible variations.

Figure 19:
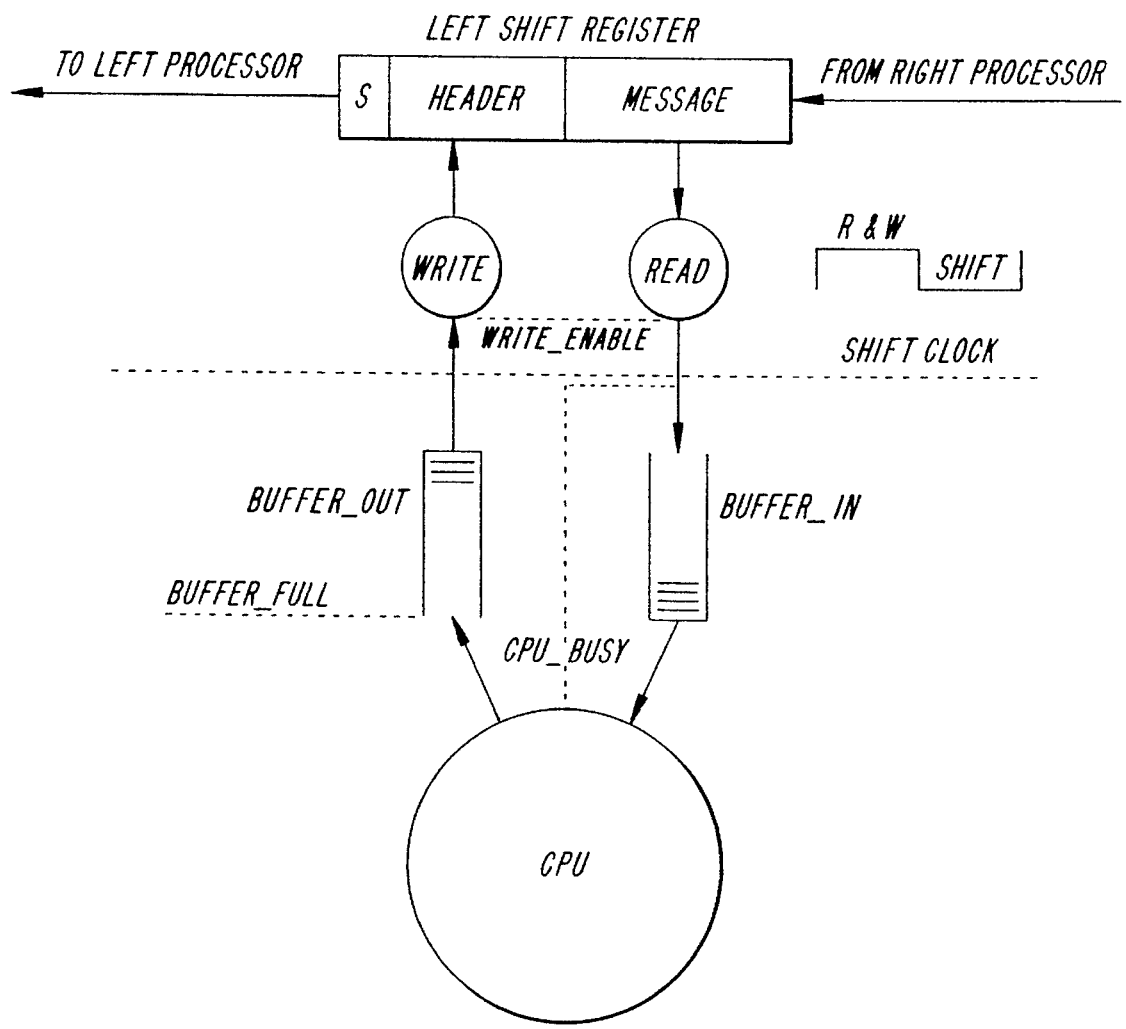
FIG. 19 shows a conceptual implementation of a SLM processor with a backbone interface.

FIG. 19 illustrates SLM Processor and Single Backbone Interface. There are three independent processes: Read, Write and CPU. The shifting register holds the rotating messages. The message header indicates the nature of the message. There can be five types of messages:

0: empty slot

1: data tuple

2: data tuple reset signal

3: program management

4: conventional operating system commands

The S bit indicates the availability of register to the WRITE process. It may be implemented either on the local circuit or as part of the message. The Shift_Clock controls the backbone rotating frequency. The shifting register can hold typically bytes of information. The programmings (or protocols) of the three processes are as follows:

```
Read:
If Global_clock=on                          /*Read/write period*/
then if register = Buffer_Out(i) and Buffer_Out(i)<>EXCLUSIVE-READ
        then Set S=available                /*Cancel returned messages*/
            purge Buffer_Out(i)
        else case of Header:                /*keep cycling*/
            Header = 4 or 3:                /*System management Msgs*/
                read register to Buffer_In(j)
                Interrupt CPU
                If message has a matching address with the local CPU
                    then Set S=available    /*remove from the ring*/
                    else Set S=occupied     /*broadcast to others*/
            Header=2:                       /*EXCLUSIVE-READ reset*/
                Purge all entries in Buffer_In(i) with matching
                        tuple name as in register
                Set S=occupied              /*broadcast until recycled*/
            Header=1:
                If cpu_busy                 /*continue shift*/
                    then Set shift=occupied
                    else If message matches with a TTNT entry
                        then if the matching tuple is the last
                                in an EXCLUSIVE-READ group /*Excl.R*/
                                then read Register to Buffer_In(i)
                                    interrupt CPU
                                    Set Header=2        /*msg reset*/
                                    Write tuple name to Register
                                    Write tuple name to Buffer_Out(i)
                                    Mark Buffer_Out(i) non-exclusive-read
                                    Set S=occupied /*keep cycling*/
                                else read Register to Buffer_In(i) /*Read*/
                                    Set S=occupied /*broadcast*/
                        else Set shift=occupied/*no match,shift*/
            Header=0:Set S=available
            End of Case
            Set write_enable                /*activate the Write Process*/
Write:
If write_enable
then if Buffer_Out is not empty and S=available
        then write Buffer_Out(i) to Register
            mark Buffer_Out(i) done
            Set S=Occupied
            Set Header according to Buffer_Out(i) /*Only 1,2,3*/
        else if S=Available then Set Header=0       /*Mark empty*/
Reset write_enable
CPU:
If interrupt
then    if Header=4 or 3
            then handle the system functions
            else    Read Buffer_In(8)
                    Purge EXCLUSIVE-READ entries in Buffer_In( )
                    Compute
                    Write to Buffer_Out(*)
                    Set Buffer_Out(*) according to DTPS-TBL
                    Set write_enable
        Attend other business and wait for interrupt again
```

Note that the Read process handles the following special cases:

a) Purge of returned messages. This protocol checks the register content against BUFFER_OUT. If there is a match and if the message is not EXCLUSIVE-READ or the message is not the last packet in an EXCLUSIVE-READ message, then the content in BUFFER_OUT is purged. This empties the message slots. A returned EXCLUSIVE-READ message (or the last packet of the message) will keep circulating until it is consumed.

b) Tuple name matching. A data tuple in Register contains an index generated by the compiler. This index is also recorded in the DTPS_TBL and local TTNTs. A simple test using the index in the local TTNTs can determine the existence of a match. All read tuples are copied to BUFFER_IN.

c) EXCLUSIVE-READ deadlock avoidance: When more than one CPU exclusively read one of many tuples belonging to the same program segment, or more than on CPU exclusively read some of the packets belonging to the same tuple, none of the CPUs will be ever completely matched. The deadlock is avoided by only exclusively read the last EXCLUSIVE-READ tuple or the last packet of an EXCLUSIVE-READ tuple in a TTNT.

Figure 20:
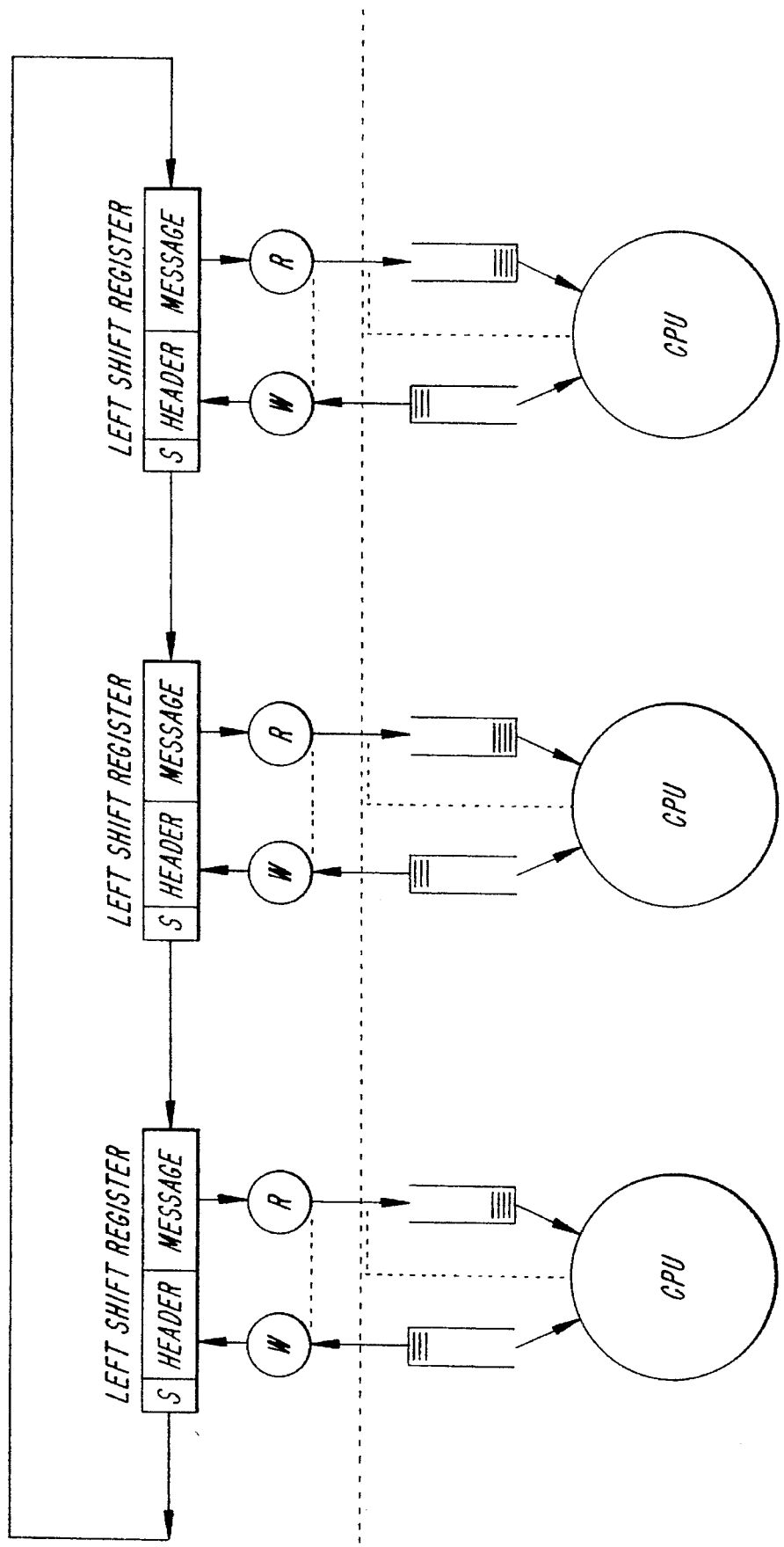
FIG. 20 illustrates an implementation of SLM with three processors.

FIG. 20 illustrates SLM with three Processors and A Single Backbone. In this structure, point-to-point, broadcast and exclusive-read of any message can be performed by any processors. When BUFFER_OUTS on all processors are full, the system enters a "lock state". The 'lock state' may be automatically unlocked when some of the CPUs become available for computing. The system enters a "deadlock state" when all CPUs are blocked for output and no empty slot is available on the backbone.

There are two solutions to this condition:

a) Expand the BUFFER-OUT sizes. This can postpone the occurrence of the lock state; and b) Increase the CPU powers or the number of CPUs. This can be used to make deadlock-free SLMs.

When CPUs are idling most of the times, the backbone is the bottleneck.

Figure 21:
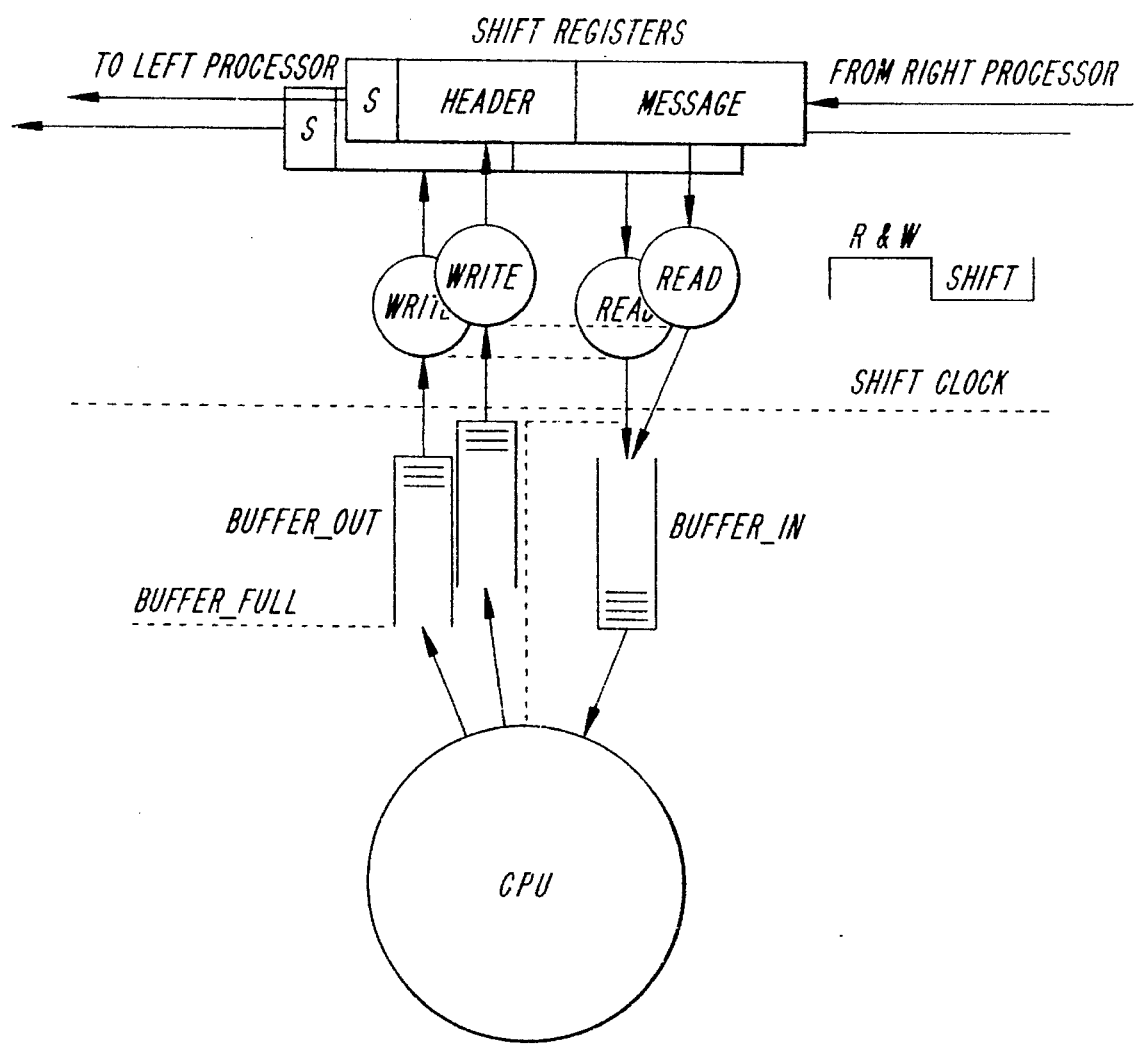
FIG. 21 illustrates a SLM construction with two parallel backbones.

FIG. 21 illustrates the CPU-to-backbone interface for a SLM system with two backbones. Both READ and WRITE processes must dispatch the messages from the to multiple backbones. The size and number of buffers should be adjusted to accommodate the increased bandwidth. The dispatch algorithm and the interface hardware implementation must assure that the malfunction of any subset of backbones will not bring down the system JR3].

The backbone initialization command sets all message (register) headers to 0.

The number of backbones affects the cost, total performance and fault tolerance degree. The final design is application dependent.

Under this simple design, processors are not guaranteed to share the backbone in a "fair" fashion—the closer neighbors of the sender will be busier than those are further away. In general, this should not affect the overall SLM performance since when all the closer neighbors are busy the further neighbors will get something to do eventually.

A restriction of this simple design is that the backbone is strictly used for data communication. It cannot be used for high quality point-to-point multi-media signal transmission since the simple protocols do not maintain virtual channels. The use of the HEFLAN protocol, U.S. patent Ser. No. 08/029,882, U.S. Pat. No. 5,402,422 A MEDIUM ACCESS CONTROL PROTOCOL FOR SINGLE-BUS MULTIMEDIA FAIR ACCESS LOCAL AREA NETWORKS, by Zheng Liu, can give both the fairness property and the multi-media capabilities.

The use of existing telecommunication technologies can implement SLMs using local and long haul networks. The shifting registers can be replaced by any existing networking system that has a ring compatible topology, i.e., Token Ring (IEEE 802.4), DQDB (IEEE) 802.6), Star-Connected ATM LAN (Fore Systems) and HEFLAN provided that they must be modified to provide the implementation of the "EXCLUSIVE-READ" function (similar to the above Read protocol.

The present invention also demonstrates a feasible design of a single backbone and a multiple-backbone SLM system. The disclosed protocols illustrate the principles for implementing:

a) Point-to-point, broadcast and EXCLUSIVE-READ message b) Message slot recycling c) Local buffer recycling d) Exclusive-read lock prevention e) SLM program management and local operating system command processing.

These principles must be used in addition to the use of other computer engineering and data communication techniques for the construction of practical SLM systems.

The present invention automatically partitions any sequential program into program segments and uses a method for executing an application program including a plurality of interrelating program segments, with each program segment labeled according to data dependencies and parallelism among the program segments, and with each program segment connected to other programs segments by a corresponding labeled data tuple. As shown in FIG. 18, the method includes the steps of receiving 1040 an execution command; transmitting 1045, on the SLM backbone 120, the labeled program segments to the plurality of computers; loading 1050 the labeled program segments into each computer of the plurality of computers; transmitting 1055, on the SLM backbone 120, the labeled data tuples to the plurality of computers; receiving 1060, at a receiving computer, a labeled data tuple; activating 1065, at the receiving computer, in response to the labeled data tuple, the program segments corresponding to the labeled data tuple; processing 1070, at the receiving computer, the activated program segments; transmitting 1075, on the SLM backbone 120, the results of the processing of the program segments as labeled data tuples; continuing 1080 to transmit, on the SLM backbone 120, the labeled data tuples to the plurality of computers; and continuing 1085 to process, at the plurality of computers, the program segments corresponding to the labeled data tuples until the entire application program is processed.

It will be apparent to those skilled in the art that various modifications may be made to the multicomputer system and method of the instant invention without departing from the scope or spirit of the invention, and it is intended that the present invention cover modifications and variations of the multicomputer system and method provided they come within the scope of the appended claims and their equivalents.

I claim:

1. A stateless machine (SLM) multicomputer system comprising:

a unidirectional slotted ring;

a plurality of computers, each computer connected to said unidirectional slotted ring, each computer having a local real memory and an operating system supporting a virtual memory and multiprogramming, with at least one of said plurality of computers, responsive to receiving from said unidirectional slotted ring an initial set of data tuples, for initiating a plurality of program segments, and for transmitting the initial set of data tuples onto said unidirectional slotted ring;

wherein each data tuple corresponding to initiating a sequential action includes an EXCLUSIVE-READ signal for informing said plurality of computers to cease contending for the data tuple after reading of the data tuple by one of said plurality of computers;

wherein said plurality of computers, responsive to receiving data tuples, activate the plurality of program segments for processing the received data tuples to produce new processed data tuples; and wherein said plurality of computers transmit the new processed data tuples onto said unidirectional slotted ring, with sequential acting tuples accompanied by corresponding EXCLUSIVE-READ signals.

2. The SLM multicomputer system as set forth in claim 1 with at least one computer of said plurality of computers including means for decomposing a sequentially composed application program into a plurality of program segments, forming an acyclic graph.

3. The SLM multicomputer system as set forth in claim 2 with said at least one computer further including:

means for analyzing each program segment of a decomposed application program; and means, responsive to analysis of each decomposed program segment, for converting each decomposed program segment for single-instruction-multiple-data (SIMD) processing.

4. The SLM multicomputer system as set forth in claim 3 with said at least one computer including:

means for generating a force-copy instruction and end-force-copy instruction to any sequential-programming language;

a parallel compiler, responsive to the force-copy instruction, for skipping dependency analysis and for forcing coarse-grain vectorizing designated repetitive program segments.

5. The SLM multicomputer system as set forth in claim 4 with said at least one computer including means for converting each decomposed program segment into labeled tuple-driven format.

6. The SLM multicomputer system as set forth in claim 5 with said at least one computer including means for duplicating tuple-driven segments onto each connected computer for allowing automatic formation of coarse-grain SIMD, MIND and pipelined processors at run time.

7. The SLM multicomputer system as set forth in claim 6 with at least one computer having decomposing means further comprising means for automatically detecting faults and means for recovering using fault-tolerant processing.

8. The SLM multicomputer system as set forth in claim 7 with said at least one computer including means for automatically scheduling heterogeneous computers for SIMD segments using a modified factoring scheduling algorithm.

9. The SLM multicomputer system as set forth in claim 8 with said at least one computer including means for automatically balancing a load of heterogeneous computers for recursive SIMD segments using a uniformly controlled depth value G.

10. The SLM multicomputer system as set forth in claim 9 further including means for resolving multiple EXCLUSIVE-READ deadlock in use.

11. The SLM multicomputer system as set forth in claim 10 further including means for assigning tuple names and decomposed segment names for multiple decomposed programs running in parallel using multiple computers.

12. The SLM multicomputer system as set forth in claim 11 with said at least one computer further comprising an operating system extension design for carrying out ordinary multiple operating systems activities and stateless parallel processing by forming conventional operating system interfaces, a stateless data token server, a stateless-program initiator, and a stateless process manager.

13. The SLM multicomputer system as set forth in claim 12 with said at least one computer including means for calculating a theoretical performance of a stateless parallel multicomputer.

14. The SLM multicomputer system as set forth in claim 12 with said at least one computer including means for generating a protocol for a READ process for each computer for implementing the SLM multicomputer system.

15. The SLM multicomputer system as set forth in claim 14 with said at least one computer comprising means for generating a protocol for the WRITE process for each computer for implementing the SLM multicomputer system.

16. The SLM multicomputer system as set forth in claim 15 with said at least one computer including means for generating a protocol for a CPU process for each computer for implementing the SLM multicomputer system.

17. A method of messaging without specified destinations using a stateless machine (SLM) multicomputer system using a plurality of computers, each of said plurality of computers having a memory, comprising the steps of:

sending a plurality of data tuples along a unidirectional slotted ring;

reading, by an available computer of said plurality of computers, an initial data tuple of a program segment into memory;

transmitting, from the available computer, in response to receiving from said unidirectional slotted ring the initial data tuple of the program segment, onto said unidirectional slotted ring an EXCLUSIVE-READ signal for informing said plurality of computers of reception of the initial data tuple of the program segment; and ceasing by said plurality of computers, in response to receiving the EXCLUSIVE-READ signal, contending for data tuples corresponding to the program segment.

18. The method using the SLM multicomputer system as set forth in claim 17 further comprising the step of decomposing a sequentially-composed application program into a plurality of program segments, thereby forming an acyclic graph.

19. The method using the SLM multicomputer system as set forth in claim 18 further comprising the steps of:

analyzing each program segment of the decomposed application program; and converting, in response to analysis of the decomposed program segment, each decomposed program segment for single-instruction-multiple-data (SIMD) processing.

20. The method using the SLM multicomputer system as set forth in claim 19 further comprising the steps of skipping, responsive to force-copy instruction, dependency analysis and forcing coarse-grain vectorizing designated repetitive program segments.

21. The method using the SLM multicomputer system as set forth in claim 20 further comprising the step of converting each decomposed program segment into labeled tuple-driven format.

22. The method using the SLM machine as set forth in claim 21 further comprising the step of duplicating tuple-driven segments onto each connected computer for allowing automatic formation of coarse-grain SIMD, MIMD and pipelined processors at run time.

23. The method using the SLM machine as set forth in claim 22 further comprising the steps of automatically detecting faults and recovering using fault-tolerant processing.

24. The method using the SLM multicomputer system as set forth in claim 23 further comprising the step of automatically scheduling heterogeneous computers for SIMD segments using a modified factoring scheduling algorithm.

25. The method using the SLM multicomputer system as set forth in claim 24 further comprising the step of automatically balancing a load of heterogeneous computers for recursive SIMD segments using a uniformly controlled depth value G.

26. The method using the SLM multicomputer system as set forth in claim 25 further including the step of resolving multiple EXCLUSIVE-READ deadlock in use.

27. The method using the SLM multicomputer system as set forth in claim 26 further including the step of assigning tuple names and decomposed segment names for multiple decomposed programs running in parallel using multiple computers.

28. The method using the SLM multicomputer system as set forth in claim 27 further comprising the step of carrying out ordinary multiple operating systems activities and stateless parallel processing by forming conventional operating system interfaces, a stateless data token server, a stateless-program initiator, and a stateless process manager.

29. The method using the SLM multicomputer system as set forth in claim 28 further comprising the step of calculating a theoretical performance of a stateless parallel multicomputer.

30. The method using the SLM multicomputer system as set forth in claim 28 further comprising the step of implementing the SLM multicomputer system using a protocol for a READ process for each computer.

31. The method using the SLM multicomputer system as set forth in claim 30 further comprising the step of implementing the SLM multicomputer system using a protocol for a WRITE process for each computer.

32. The method using the SLM multicomputer system as set forth in claim 31 further comprising the step of implementing the SLM multicomputer system using a protocol for a CPU process for each computer.

33. A method of messaging without specified destinations using a stateless machine (SLM) multicomputer system using a plurality of computers, each of said plurality of computers having a memory, comprising the steps of:

sending a plurality of data tuples along a unidirectional slotted ring;

reading, by an available computer of said plurality of computers, an initial data tuple of a subset of a partitioned program into memory;

transmitting, from the available computer, in response to receiving from said unidirectional slotted ring the initial data tuple of the subset of the partitioned program, onto said unidirectional slotted ring an EXCLUSIVE-READ signal for informing said plurality of computers of reception of the initial data tuple of the subset of the partitioned program; and ceasing by said plurality of computers, in response to receiving the EXCLUSIVE-READ signal, contending for data tuples corresponding to the subset of the partitioned program.

34. A method using a stateless machine (SLM) multicomputer system using a plurality of computers connected to a unidirectional slotted ring, of processing an application program having a plurality of program segments, comprising the steps of:

sending the plurality of program segments, each of said plurality of program segments labeled according to data dependencies and connected to other program segments by a corresponding plurality of labeled data tuples, along the unidirectional slotted ring;

loading the plurality of program segments into each computer of said plurality of computers;

circulating the plurality of labeled data tuples through said plurality of computers;

receiving, by at least one of said plurality of computers, a matching set of data tuples;

activating a program segment corresponding to the matching set of data tuples;

processing the activated program segment;

transmitting, on the unidirectional slotted ring, a processed result as new labeled sequential acting data tuples, with each new labeled sequential acting data tuple accompanied by an EXCLUSIVE-READ signal; and processing, by said plurality of computers, the new labeled sequential acting data tuples.

35. The method using the SLM multicomputer system as set forth in claim 34 further comprising the step of accompanying at least one of said plurality of labeled data tuples with an EXCLUSIVE-READ signal.

36. The method using the SLM multicomputer system as set forth in claim 34 further comprising the step of decomposing a sequentially-composed application program into a plurality of program segments, thereby forming an acyclic graph.

37. The method using the SLM multicomputer system as set forth in claim 36 further comprising the steps of:

analyzing each program segment of the decomposed application program; and converting, in response to analysis of the decomposed program segment, each decomposed program segment for single-instruction-multiple-data (SIMD) processing.

38. The method using the SLM multicomputer system as set forth in claim 37 further comprising the steps of skipping, responsive to force-copy instruction, dependency analysis and forcing coarse-grain vectorizing designated repetitive program segments.

39. The method using the SLM multicomputer system as set forth in claim 36 further comprising the step of converting each decomposed program segment into labeled tuple-driven format.

40. The method using the SLM machine as set forth in claim 39 further comprising the step of duplicating tuple-driven segments onto each connected computer for allowing automatic formation of coarse-grain SIMD, MIMD and pipelined processors at run time.

41. The method using the SLM machine as set forth in claim 40 further comprising the steps of automatically detecting faults and recovering using fault-tolerant processing.

42. The method using the SLM multicomputer system as set forth in claim 41 further comprising the step of automatically scheduling heterogeneous computers for SIMD segments using a modified factoring scheduling algorithm.

43. The method using the SLM multicomputer system as set forth in claim 42 further comprising the step of automatically balancing a load of heterogeneous computers for recursive SIMD segments using a uniformly controlled depth value G.

44. The method using the SLM multicomputer system as set forth in claim 35 further including the step of resolving multiple EXCLUSIVE-READ deadlock in use.

45. The method using the SLM multicomputer system as set forth in claim 34 further including the step of assigning tuple names and decomposed segment names for multiple decomposed programs running in parallel using multiple computers.

46. The method using the SLM multicomputer system as set forth in claim 36 further comprising the step of carrying out ordinary multiple operating systems activities and stateless parallel processing by forming conventional operating system interfaces, a stateless data token server, a stateless-program initiator, and a stateless process manager.

47. The method using the SLM multicomputer system as set forth in claim 36 further comprising the step of implementing the SLM multicomputer system using a protocol for a READ process for each computer.

48. The method using the SLM multicomputer system as set forth in claim 36 further comprising the step of implementing the SLM multicomputer system using a protocol for a WRITE process for each computer.

49. The method using the SLM multicomputer system as set forth in claim 36 further comprising the step of implementing the SLM multicomputer system using a protocol for a CPU process for each computer.

50. The method using the SLM multicomputer system as set forth in claim 36 further comprising the step of calculating a theoretical performance of a stateless parallel multicomputer.

51. A method for parallel processing using a stateless machine (SLM) multicomputer system having a plurality of computers connected to a unidirectional slotted ring, each of said plurality of computers having a local real memory, comprising the steps of:

sending a plurality of data tuples along the unidirectional slotted ring;

detecting an initial data tuple of a program segment by any one of the plurality of computers;

reading the initial data tuple into a local real memory of the detecting computer;

transmitting, from the detecting computer, in response to reading from said unidirectional slotted ring the initial data tuple of the program segment, onto said unidirectional slotted ring an EXCLUSIVE-READ signal for informing said plurality of computers of reception of the initial data tuple of the program segment;

ceasing by said plurality of computers, in response to receiving the EXCLUSIVE-READ signal, contending for data tuples corresponding to the program segment;

activating the program segment for processing the initial data tuple, using the local real memory, to produce a new processed data tuple; and sending the new processed data tuple along the unidirectional slotted ring.

52. The method as set forth in claim 51, further comprising the steps of repeating the steps of detecting the new processed data tuple of a second program segment by any one of the plurality of computers;

reading the new processed data tuple into a local real memory of the detecting computer;

transmitting, from the detecting computer, in response to reading from said unidirectional slotted ring the new processed data tuple of the second program segment, onto said unidirectional slotted ring an EXCLUSIVE-RED signal for informing said plurality of computers of reception of the new processed data tuple of the second program segment;

ceasing by said plurality of computers, in response to receiving the EXCLUSIVE-READ signal, contending for data tuples corresponding to the second program segment;

activating the second program segment for processing the new processed data tuple, using the local real memory, to produce a second new processed data tuple; and sending the second new processed data tuple along the unidirectional slotted ring.

53. A method for messaging without destination using a stateless machine (SLM) multicomputer system having a plurality of computers comprising the steps of:

sending a plurality of data tuples along a unidirectional slotted ring;

reading the plurality of data tuples by said plurality of computers;

transmitting, from one of said plurality of computers, in response to receiving from said unidirectional slotted ring an initial data tuple of a subset of a partitioned program, onto said unidirectional slotted ring an EXCLUSIVE-READ signal for informing said plurality of computers of reception of the initial data tuple of the subset of the partitioned program;

ceasing by said plurality of computers, in response to receiving the EXCLUSIVE-READ signal, contending for data tuples corresponding to the subset of the partitioned program;

processing, by said plurality of computers, the plurality of data tuples to produce new data tuples; and sending the plurality of new data tuples along the unidirectional slotted ring.

\* \* \* \* \*